May 10, 1960 T. H. GAVIN 2,935,903
SAW SHARPENING DEVICE
Filed Feb. 27, 1956 13 Sheets-Sheet 3

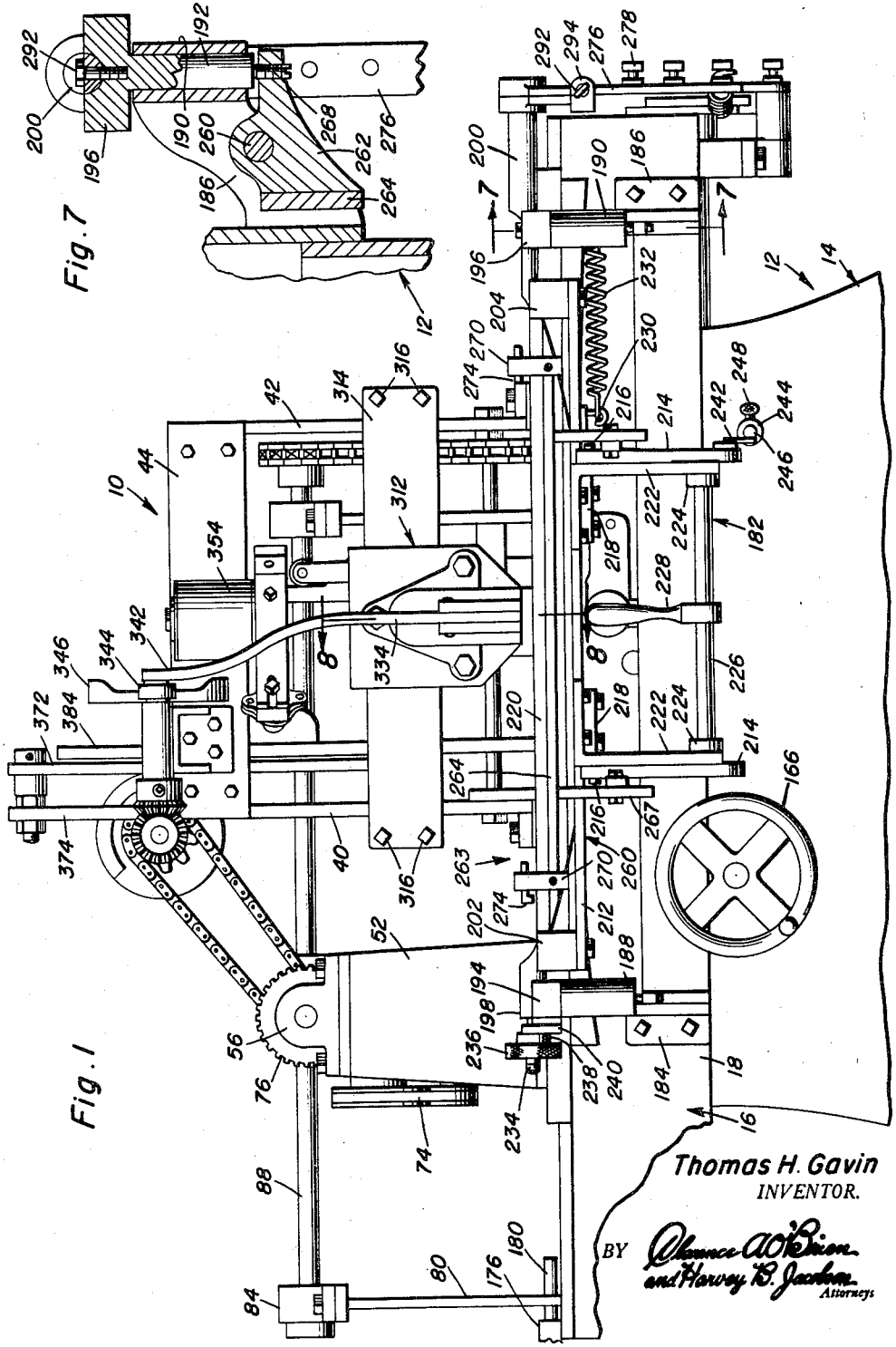

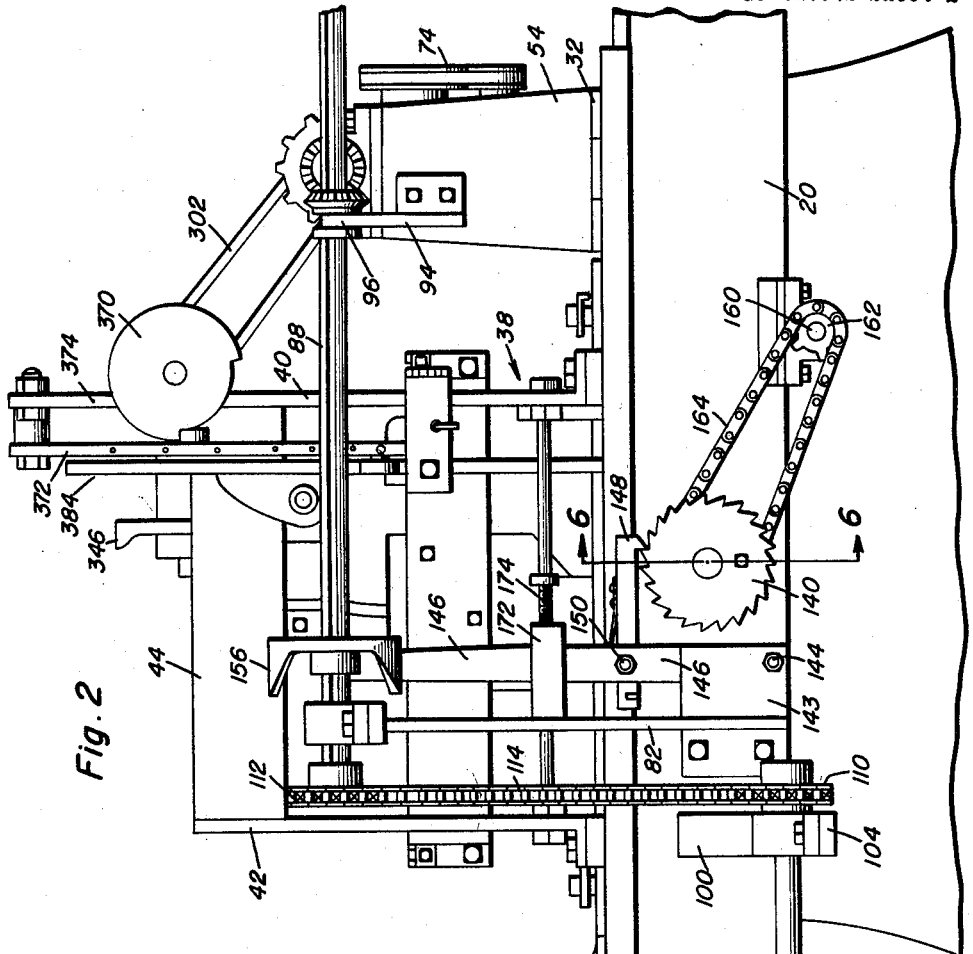
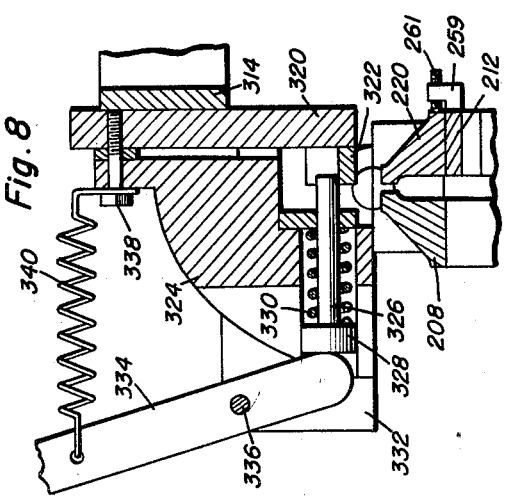

Thomas H. Gavin
INVENTOR.

BY
*Attorneys*

May 10, 1960　　　T. H. GAVIN　　　2,935,903
SAW SHARPENING DEVICE

Filed Feb. 27, 1956　　　13 Sheets-Sheet 5

Thomas H. Gavin
INVENTOR.

BY
Attorneys

May 10, 1960  T. H. GAVIN  2,935,903
SAW SHARPENING DEVICE
Filed Feb. 27, 1956  13 Sheets-Sheet 6

Thomas H. Gavin
INVENTOR.

May 10, 1960 T. H. GAVIN 2,935,903
SAW SHARPENING DEVICE

Filed Feb. 27, 1956 13 Sheets-Sheet 7

Thomas H. Gavin
INVENTOR.

BY
Attorneys

May 10, 1960 T. H. GAVIN 2,935,903
SAW SHARPENING DEVICE
Filed Feb. 27, 1956 13 Sheets-Sheet 8
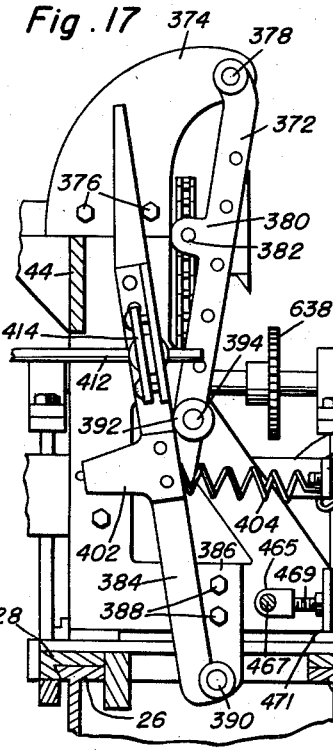
Fig. 17
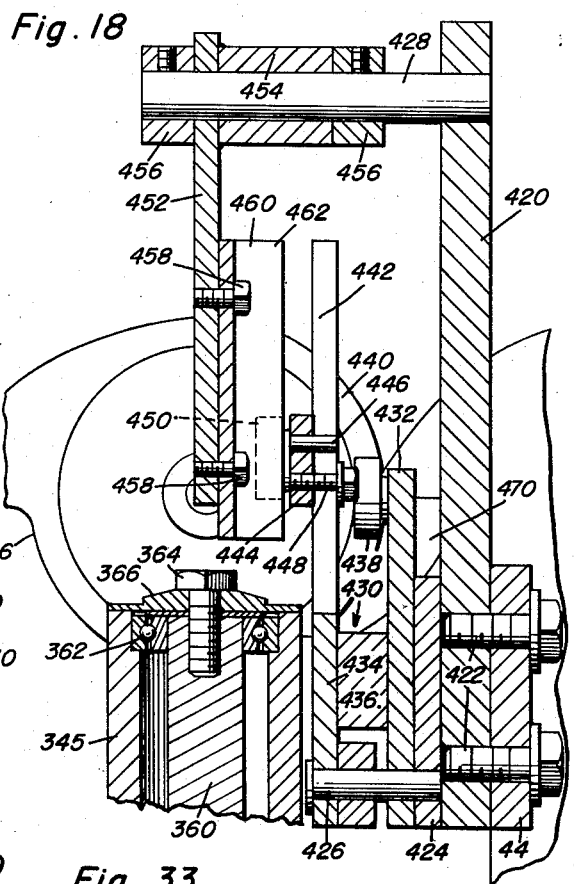
Fig. 18

Fig. 36
Fig. 37

Thomas H. Gavin
INVENTOR.
BY *Clarence A. O'Brien*
*and Harvey B. Jackson*
Attorneys May 10, 1960 T. H. GAVIN 2,935,903
SAW SHARPENING DEVICE
Filed Feb. 27, 1956 13 Sheets-Sheet 9
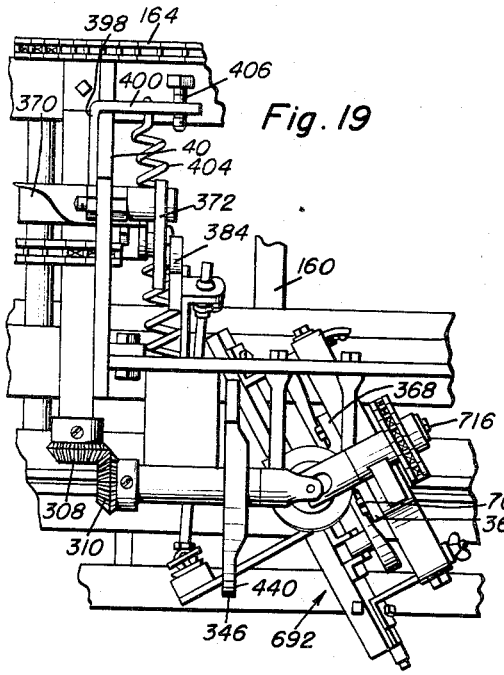
Fig. 19
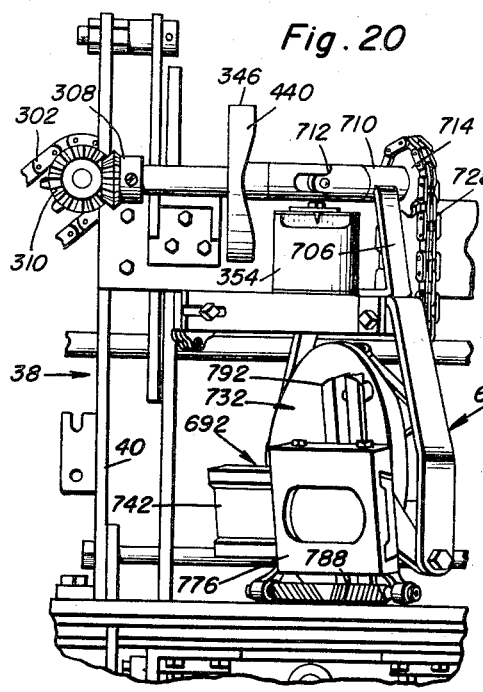
Fig. 20
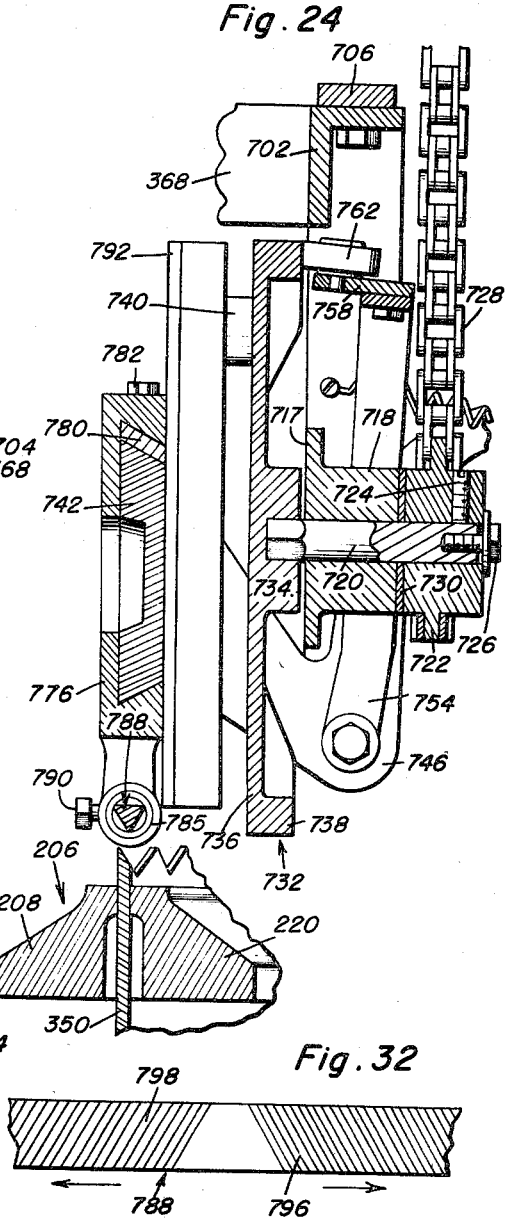
Fig. 24
Fig. 32
Thomas H. Gavin
INVENTOR.
BY
Attorneys May 10, 1960 T. H. GAVIN 2,935,903
SAW SHARPENING DEVICE
Filed Feb. 27, 1956 13 Sheets-Sheet 10
Fig. 21
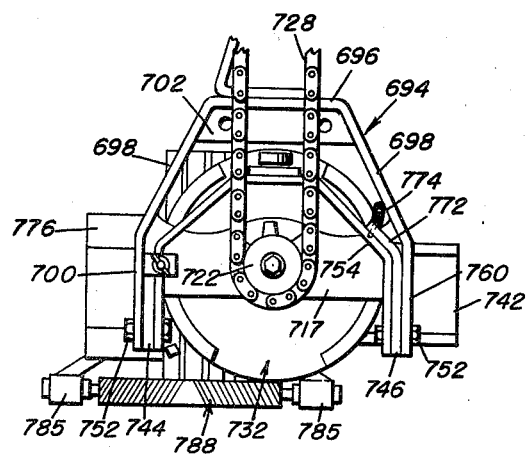
Fig. 22
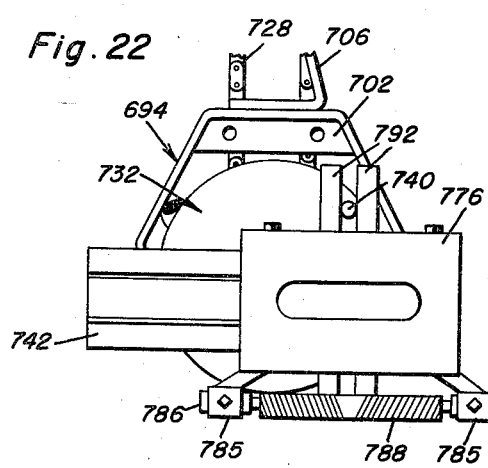
Fig. 23
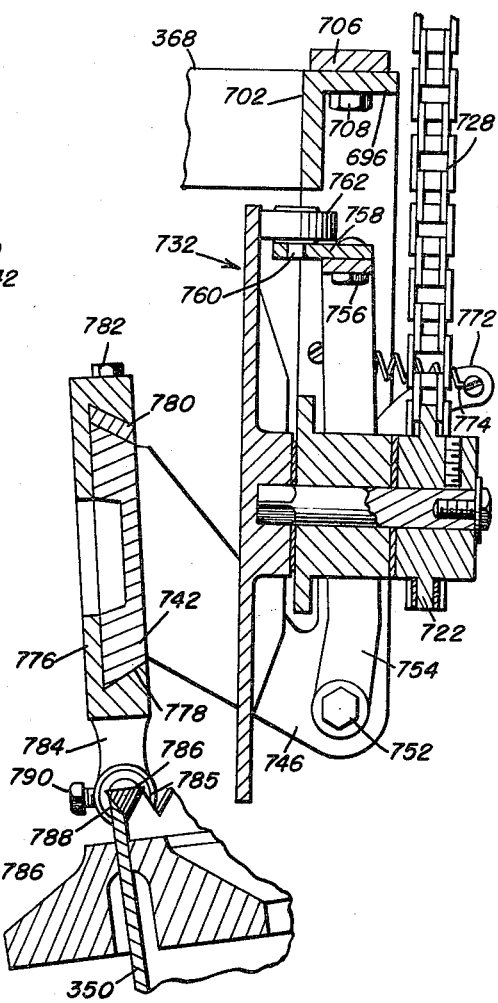
Fig. 25
Thomas H. Gavin
INVENTOR.
BY *Clarence A. O'Brien*
*and Harvey B. Jackson*
Attorneys May 10, 1960 T. H. GAVIN 2,935,903
SAW SHARPENING DEVICE
Filed Feb. 27, 1956 13 Sheets-Sheet 11

Thomas H. Gavin
INVENTOR.

BY *Clarence A. O'Brien*
*and Harvey B. Jacobson*
Attorneys

May 10, 1960 T. H. GAVIN 2,935,903
SAW SHARPENING DEVICE
Filed Feb. 27, 1956 13 Sheets-Sheet 12
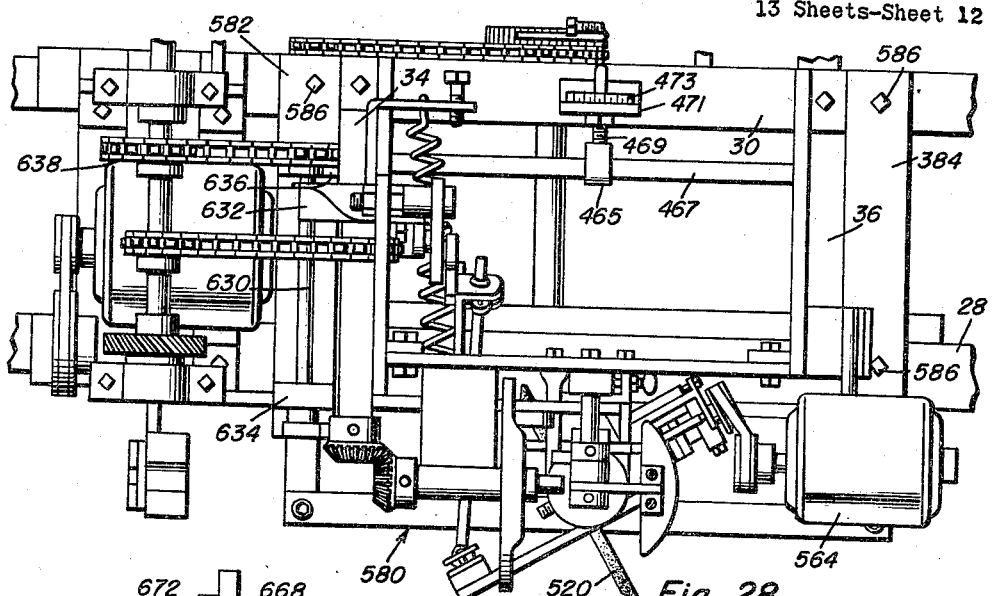
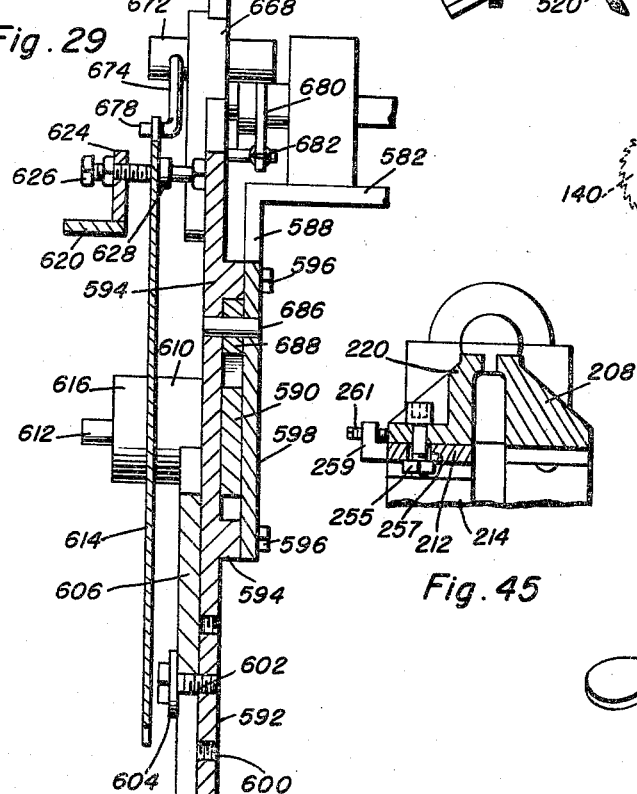
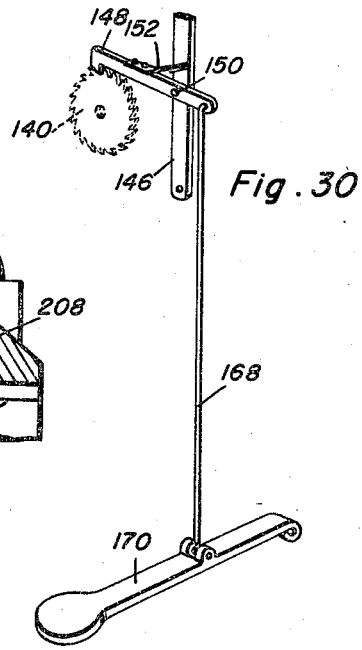
Thomas H. Gavin
INVENTOR.

May 10, 1960  T. H. GAVIN  2,935,903
SAW SHARPENING DEVICE

Filed Feb. 27, 1956  13 Sheets-Sheet 13

Thomas H. Gavin
INVENTOR.

BY
Attorneys

United States Patent Office 2,935,903
Patented May 10, 1960

2,935,903

SAW SHARPENING DEVICE

Thomas H. Gavin, Gretna, La.

Application February 27, 1956, Serial No. 567,858

14 Claims. (Cl. 76—29)

This invention relates in general to new and useful improvements in tool forming machines, and more specifically to improve saw sharpening device or machine.

The primary object of this invention is to provide an improved saw tooth forming machine which is of such a construction whereby with adjustments it can be utilized for the forming of new teeth in a saw, and after such new teeth have been set, may be utilized for sharpening such new teeth either by a grinding process or by filing.

Another object of this invention is to provide an improved saw sharpening machine which is provided with a rotary grinding wheel assembly for automatically sharpening teeth of saws, the grinding wheel assembly being of such a nature whereby with minor adaptations for supporting of saws, the saw sharpening machine may be converted for sharpening either hand saws or circular saw blades.

Another object of this invention is to provide an improved saw sharpening machine which includes a saw support of the type including a saw clamp, the saw clamp being mounted for vertical movement with respect to the saw sharpening member of the machine and there being provided suitable means for effecting control of the vertical movement of the saw clamp and a saw carried thereby whereby the desired bow or curvature may be formed in the teeth of the saw along the length thereof.

Still another object of this invention is to provide an improved saw sharpening machine which is so constructed whereby the sharpening operation with either a file or a rotary abrasive wheel is of such a nature whereby the normal hand sharpening operation is simulated in order that the teeth of the saw being sharpened may be properly sharpened to the desired angle or bevel.

Yet another object of this invention is to provide an improved saw sharpening machine which includes a base having mounted thereon for longitudinal movement a carriage, there being carried by the base a saw support, the carriage being provided with an adjustable sharpening member with the sharpening member being mounted for pivotal movement transversely of the saw support and there being provided means for effecting swinging of the sharpening member and movement of the carriage along the base whereby intermediate the sharpening of adjacent teeth the carriage is moved relative to the saw support a distance equal to the spacing of the teeth of the saw being sharpened and the sharpening member is pivoted to a reverse angle whereby the bevel of adjacent teeth is reversed.

A further object of this invention is to provide an improved saw sharpening machine which includes a mounting assembly for supporting an abrasive member, the mounting assembly being so constructed whereby the pressure contact between the abrasive member and teeth of the saw being filed may be regulated to that desired.

Still a further object of this invention is to provide an improved saw sharpening machine which includes a saw support having a saw clamp, the saw clamp being adjustable longitudinally of the saw sharpening machine and longitudinally relative to a saw sharpening member whereby a saw carried by the saw clamp may be slightly advanced for receiving a repeated pass by the saw sharpening member.

Still another object of this invention is to provide an improved saw sharpening machine of the type which includes an automatic feed for a saw sharpening device relative to a saw blade being sharpened, there being provided a suitable stop for repeatedly and initially positioning the saw sharpening member with respect to first teeth of the saw blade whereby sequential sharpening steps may be performed with the machine with the saw blade being accurately positioned with respect to the sharpening member each time.

Still a further object of this invention is to provide an improved saw support in the form of a saw clamp or vise, the saw support being so constructed whereby the saw clamp may be selectively vertically moved to effect the desired curvature of the teeth of a saw and may be rocked transversely so that the sharpening action on the teeth being sharpened results in the desired transverse bevel and the flow or filling of the teeth which are in the desired direction. The filling of the teeth is that flow of metal which may occur during a sharpening operation which permits the desired shaping of a tooth with a minimum of filing or grinding.

Yet a further object of this invention is to provide an improved saw sharpening machine which includes a saw support and a carriage movable relative to the saw support, the carriage being provided first with a punch for forming new teeth with the punch being removable and replaceable with a suitable saw sharpening member, either a file or a grinding wheel, with the sharpening member being positioned in the exact relation to the newly formed teeth as the punch even though the saw has been removed from the saw support for the purpose of setting teeth whereby an accurate sharpening of the newly formed teeth is possible.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a front elevational view of the saw sharpening machine which is the subject of this invention and shows the general details thereof, the saw sharpening machine being illustrated with the punch attachment in place for punching new teeth on a saw blade, the saw blade not being illustrated, a lower portion of the base of the saw sharpening machine being broken away;

Figure 2 is a fragmentary rear elevational view of the saw sharpening machine of Figure 1 and shows the details of the means for effecting step by step movement of the carriage and the punch carried thereby whereby the teeth are formed along a saw blade in the desired spaced relation, there also being illustrated other portions of the drive means for the saw sharpening machine;

Figure 4:
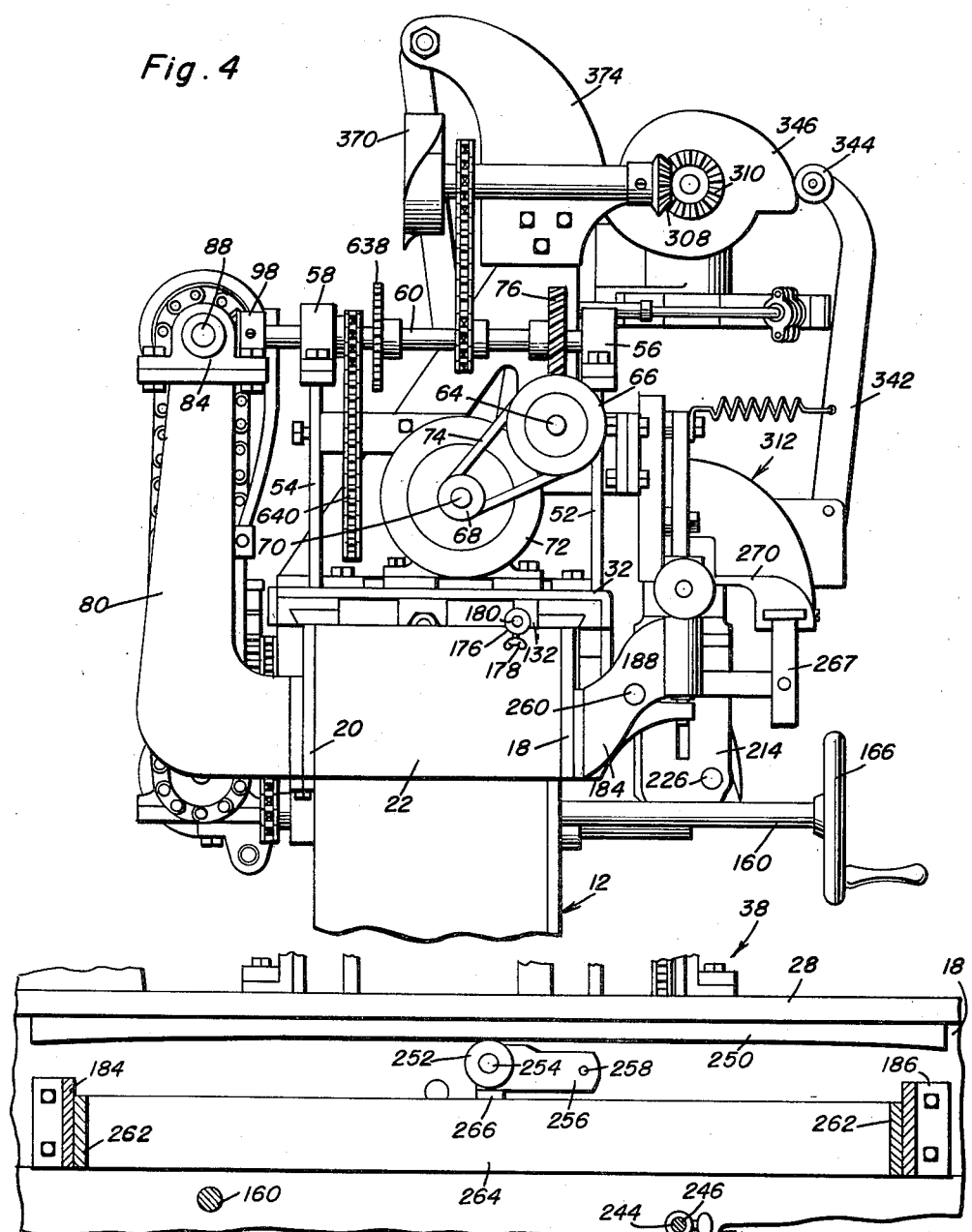
Figure 5:
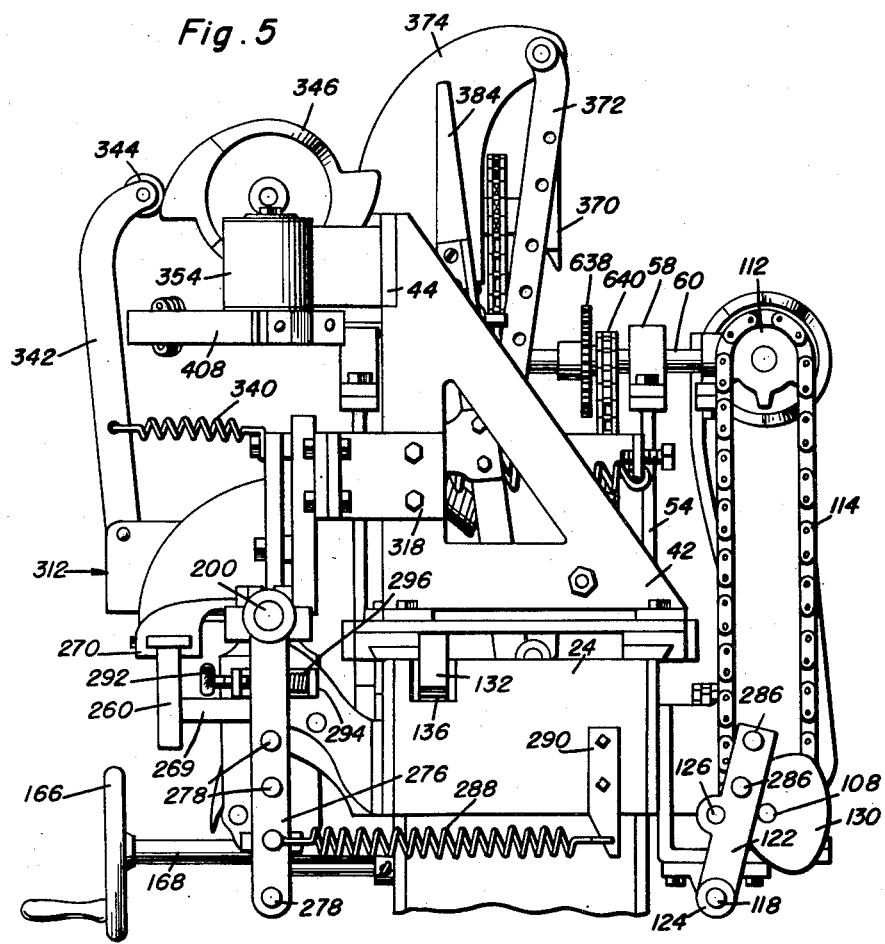
Figure 6:
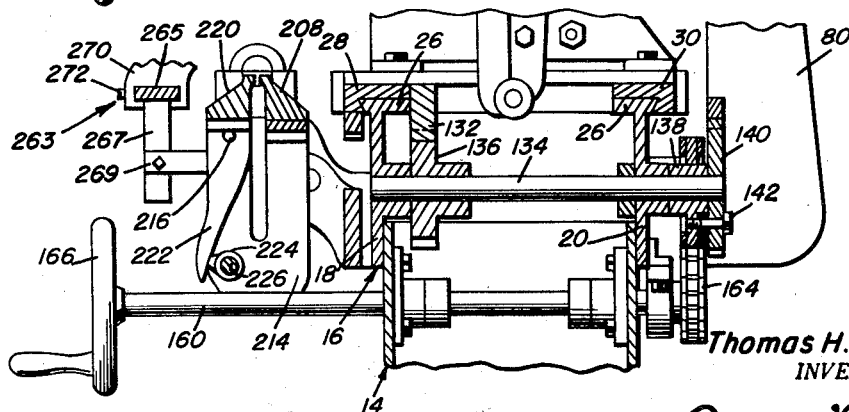
Figure 10:
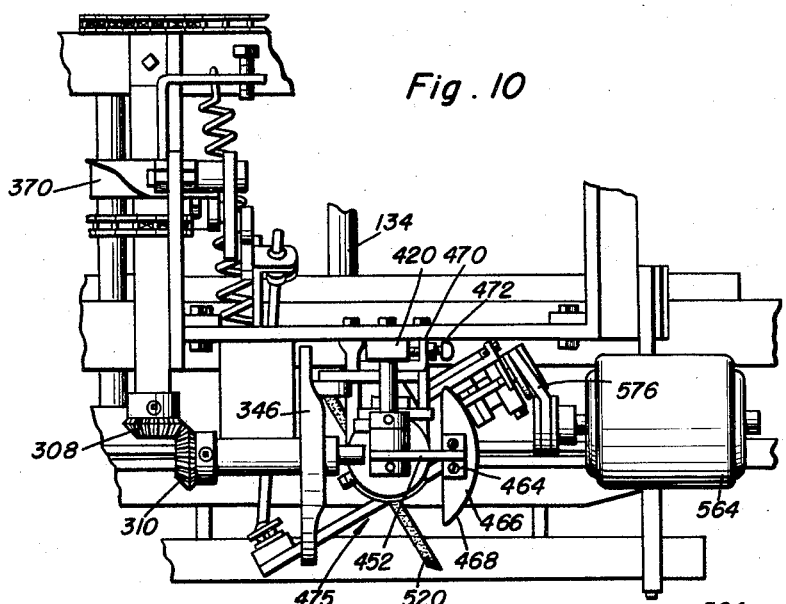
Figure 11:
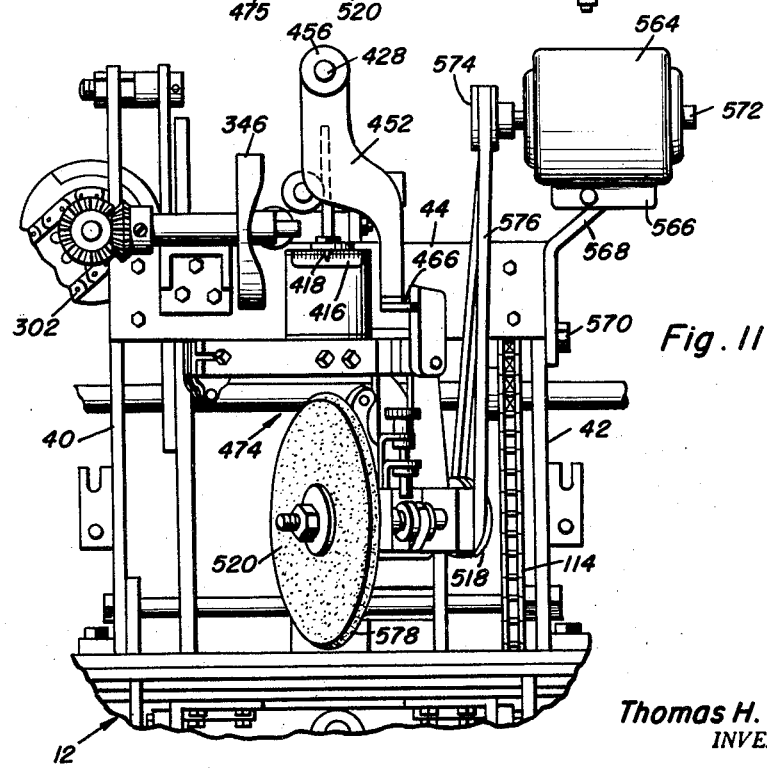
Figure 12:
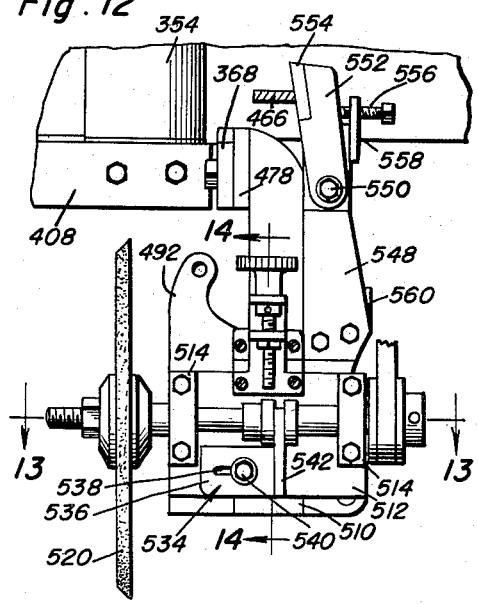
Figure 15:
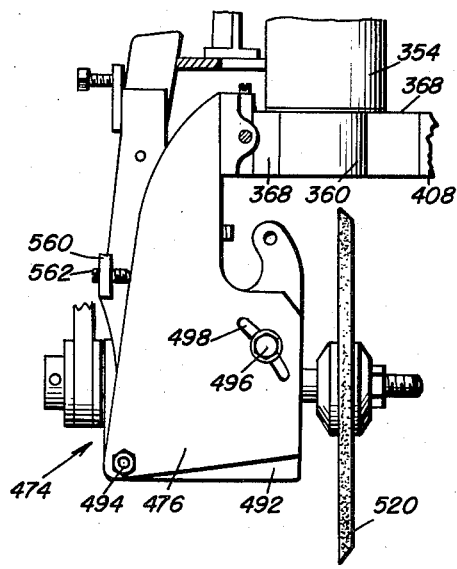
Figure 13:
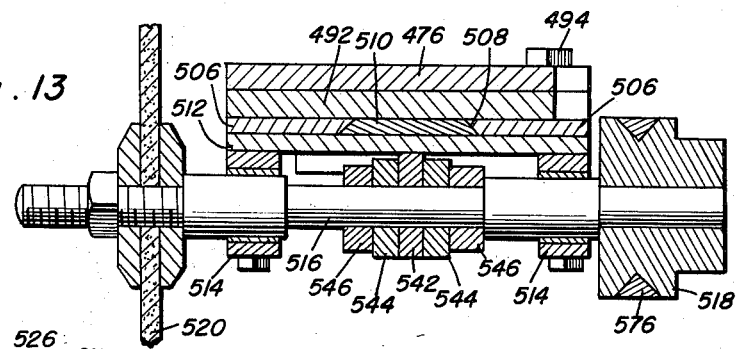
Figure 14:
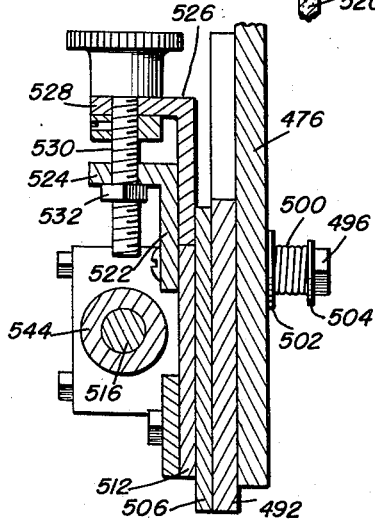
Figure 16:
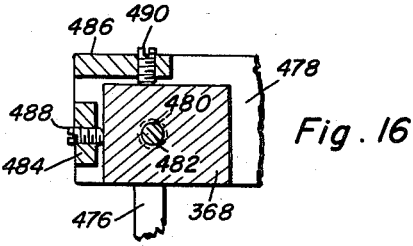
Figure 39:
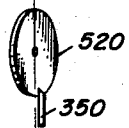
Figure 40:
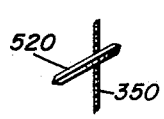
Figure 33:
Figure 34:
Figure 41:
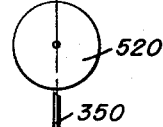
Figure 42:
Figure 35:
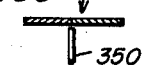
Figure 38:
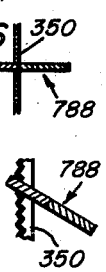
Figure 43:
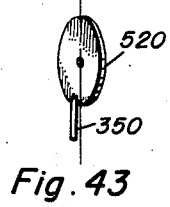
Figure 44:
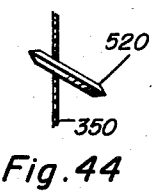
Figure 26:
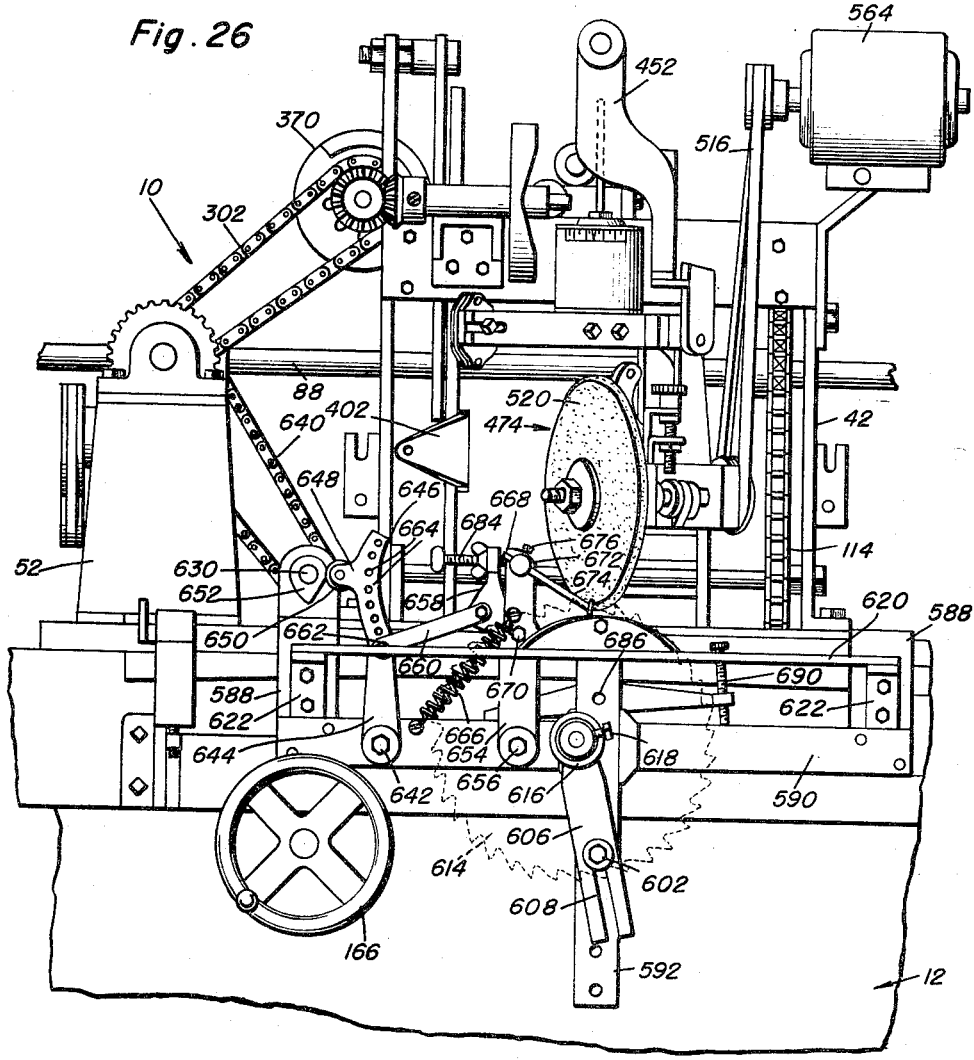
Figure 27:
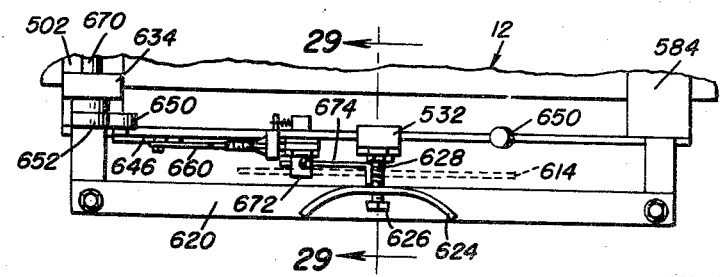
Figure 31:
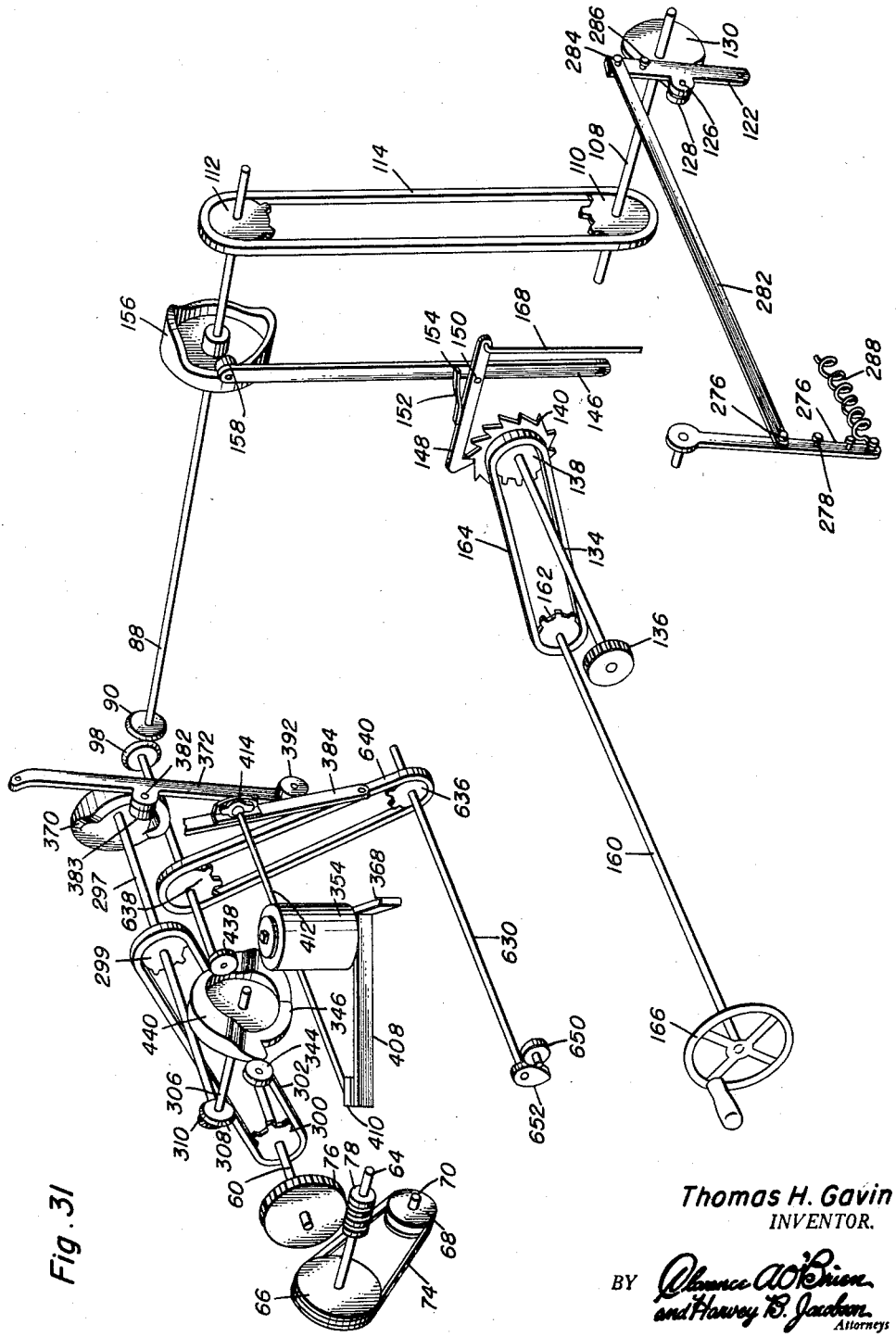

Figure 4 is an end elevational view of the saw sharpening machine of Figure 1 viewed from the left and shows the specific details of the mounting of the carriage on the base and the specific drive means for the various components of the sharpening mechanism carried by the carriage, there also being illustrated further details of the drive for the punch including a cam drive member, the lower portion of the base being broken away;

Figure 5 is an end view of the saw sharpening machine of Figure 1 taken from the right and shows further the specific details of the machine including the various drive elements thereof, a lower portion of the base being broken away;

Figure 6 is an enlarged fragmentary transverse vertical sectional view taken substantially upon the plane indicated by the section line 6—6 of Figure 2 and shows the specific details of the connection between the carriage and the base, the specific details of the drive means for effecting controlled movement of the carriage longitudinally along the base, and specific details of the saw support including the details of the saw clamp thereof;

Figure 7 is an enlarged fragmentary transverse vertical sectional view taken substantially upon the plane indicated by the section line 7—7 of Figure 1 and shows the manner in which the saw clamp is mounted for selective vertical positioning, there also being illustrated the means for retaining the saw clamp in a selected vertical position;

Figure 8 is an enlarged fragmentary transverse vertical sectional view taken substantially upon the plane indicated by the section line 8—8 of Figure 1 and shows the specific working details of the saw punch for forming new teeth in a saw blade and the relationship thereof with respect to the saw clamp of the saw support;

Figure 9 is a fragmentary longitudinal vertical sectional view taken along a longitudinal line in front of the base through the saw support and shows the specific details of a cam member carried by the carriage and a follower of the saw support for selectively elevating the saw clamp as the carriage moves along the base relative to the saw support whereby the relationship between the saw blade being sharpened and a sharpening device carried by the carriage is varied to compensate for the longitudinal curvature or bowed relation of the teeth of the saw blade;

Figure 10 is a fragmentary top plan view of the saw sharpening machine showing the punch thereof removed from the carriage and there being mounted on a pivotally mounted mounting bracket a sharpening mechanism including a rotary grinding wheel, there also being illustrated the means for driving the wheel;

Figure 11 is an enlarged fragmentary elevational view of the saw sharpening machine as modified in Figure 10 and shows further the details of the grinding wheel assembly and the means for positioning the same with respect to the saw support;

Figure 12 is an enlarged fragmentary transverse vertical sectional view taken along a plane parallel to the axis of the shaft for the grinding wheel and shows more specifically the details of the grinding wheel assembly including the means for mounting the shaft thereof;

Figure 13 is an enlarged transverse horizontal sectional view taken substantially upon the plane indicated by the section line 13—13 of Figure 12 and shows the specific mounting for the shaft for the grinding wheel and the manner in which it is adjustably positioned longitudinally of its mounting bracket;

Figure 14 is an enlarged fragmentary transverse vertical sectional view taken substantially upon the plane indicated by the section line 14—14 of Figure 12 and shows the manner in which the grinding wheel is vertically adjusted with respect to its mounting bracket;

Figure 15 is a rear elevational view of the mounting assembly for the shaft of the grinding wheel of Figure 12 and shows further the specific details thereof including the details of the means for selectively elevating the grinding wheel to an inoperative position and the means for varying the pressure contact between the grinding wheel and the teeth being ground;

Figure 16 is an enlarged fragmentary transverse vertical sectional view showing the adjustable connection between the mounting assembly for the grinding wheel and a mounting bracket carried by the carriage;

Figure 17 is a fragmentary transverse vertical sectional view taken through a rear portion of the saw sharpening machine adjacent the left end thereof and shows the specific details of the means for effecting pivoting of the mounting bracket whereby the sharpening member may be pivoted transversely of the saw support;

Figure 18 is an enlarged transverse vertical sectional view taken through the upper portion of the mounting bracket and the means for effecting pivoting of the mounting assembly for a sharpening member to selectively raise and lower the sharpening member in timed sequence to the pivoting of such sharpening member with respect to the saw support;

Figure 19 is a top plan view of the central portion of the saw sharpening machine and shows the carriage thereof now provided with a filing attachment, there being illustrated the drive means for effecting reciprocation of a file carried by the filing attachment;

Figure 20 is a fragmentary front elevational view of the saw sharpening machine of Figure 19 and shows further the details of the saw filing attachment and the drive means for the same;

Figure 21 is a fragmentary elevational view of the file attachment for the saw sharpening machine taken parallel to the file thereof and shows the specific details of the drive means;

Figure 22 is a rear elevational view of the file attachment of Figure 21 and shows further the details of the drive means for the file and the manner in which the file is removably carried by a support therefor;

Figure 23 is an enlarged fragmentary transverse sectional view taken through the saw sharpening machine along a plane normal to the axis of the file and intersecting with the file and shows the specific details of the means for effecting the reciprocation of the file and the means for elevating the file with respect to a saw blade being sharpened, there also being illustrated portions of the saw clamp and the saw mounted therein being sharpened by the file;

Figure 24 is an enlarged fragmentary sectional view similar to Figure 23 and shows the file in an elevated position with respect to the saw blade whereby the file may be shifted with respect to the saw blade to a different angle to reverse the bevel of the next adjacent teeth and the saw blade shifted with respect to the file;

Figure 25 is an enlarged fragmentary transverse horizontal sectional view taken through the mounting assembly for the file blade and shows the specific details of the means for varying the pressure contact between the file blade and the saw being sharpened;

Figure 26 is an elevational view of the saw sharpening machine with the grinding wheel attachment mounted on the carriage thereof and a circular saw blade support carried by the base thereof, the circular saw blade being sharpened being shown by broken lines;

Figure 27 is a fragmentary top plan view of the circular saw support and the means for advancing the teeth thereof during a sharpening operation and shows the specific details of the means for advancing the teeth;

Figure 28 is a fragmentary top plan view of the saw sharpening machine when equipped for the sharpening of circular saw blades by the use of a grinding wheel;

Figure 29 is an enlarged fragmentary transverse vertical sectional view taken substantially upon the plane indicated by the section line 29—29 of Figure 27 and shows the specific details of the circular saw blade support and the relationship between a circular saw blade and elements thereof;

Figure 30 is a schematic perspective view showing the details of means for rendering a dog of a rack gear and dog advancing assembly inoperative by means of a foot-lever;

Figure 31 is a schematic perspective view of the various drive elements of the saw sharpening device and shows the connections between the same;

Figure 32 is an enlarged fragmentary plan view of the file utilized in connection with the file attachment and shows the specific details of the teeth thereof;

Figure 33 is a schematic transverse elevational view showing the relationship between a file and a saw blade in an initial teeth sharpening position;

Figure 34 is a schematic top plan view of the file and saw blade of Figure 33 and shows the angular relationship between the file and the saw blade in the initial position of the file;

Figure 35 is a schematic transverse elevational view of the saw blade and file of Figure 33 and shows the file in an intermediate position out of engagement with the saw blade whereby the saw blade may be advanced to the next tooth with respect to the file;

Figure 36 is a schematic top plan view of the saw and file arrangement of Figure 35 and shows the specific position of the file in an intermediate stage of its operation;

Figure 37 is a schematic transverse vertical sectional view similar to Figures 33 and 35 and shows the file at its end of its stroke preparatory for a return stroke;

Figure 38 is a top plan view of the schematic arrangement of Figure 37 and shows the angular relationship of the file with respect to the saw to effect a reverse bevel on the next tooth being sharpened;

Figure 39 is a schematic elevational view taken transversely of the saw being sharpened by a grinding wheel of the saw sharpening machine and shows the offset relationship of the center of the grinding wheel with respect to the axis of the saw blade;

Figure 40 is a top plan view of the saw blade and grinding wheel arrangement of Figure 39 and shows the angular relationship between the grinding wheel and the saw blade in the initial grinding position of one tooth of the saw blade;

Figure 41 is a schematic transverse elevational view similar to Figure 39 and shows the grinding wheel in an intermediate position elevated above the saw blade whereby the saw blade may be shifted to present a next tooth to be sharpened;

Figure 42 is a top plan view of the saw blade and grinding wheel arrangement of Figure 41 and shows the intermediate position of the grinding wheel;

Figure 43 is a schematic transverse vertical sectional view similar to Figure 39 and shows the position of the grinding wheel as being reversed with respect to the saw blade to effect the proper transverse bevel of the teeth being ground;

Figure 44 is a top plan view of the schematic view of Figure 43 and shows the reverse angular relationship of the grinding wheel with respect to the saw blade with the adjacent teeth as being ground; and Figure 45 is an enlarged fragmentary transverse vertical sectional view taken through the clamp of the saw support and shows the manner in which one of the clamps is adjustably mounted with respect to a fixed clamp to effect the clamping of a saw blade therebetween.

Referring now to the drawings in detail, it will be seen that there is illustrated in Figures 1 through 5 and 31 the basic components of the present invention. The sharpening machine, which is the subject of this invention, is referred to in general by the reference numeral 10. The saw sharpening machine 10 includes a base which is referred to in general by the reference numeral 12. The base 12 includes a lower portion 14 which may be of any construction and if desired may be cast in hollow form. Carried by the lower portion 14 is an elongated, generally rectangular cross sectional upper portion 16. The upper portion 16, like the lower portion 14, is also hollow. The upper portion 16 includes a front wall 18, a rear wall 20, and end walls 22 and 24. Carried by the upper portion 16 of the base 12 and extending along the upper edges of the front wall 18 and the rear wall 20 are elongated, longitudinally extending ways 26. The ways 26 are disposed in transversely spaced relation, as is best illustrated in Figure 6 and has engaged therewith suitable guides 28 and 30, the guide 28 being disposed at the front of the sharpening machine 10.

Extending transversely of the guides 28 and 30 and secured thereto at longitudinally spaced intervals are plates 32, 34 and 36, the plates being longitudinally spaced.

The guides 28 and 30 and the plates 32, 34 and 36 form the basic frame of a carriage which is referred to in general by the reference numeral 38. The carriage 38 also includes a pair of upstanding, triangular in outline frame members 40 and 42, the outline of these frame members being best illustrated in Figure 5. The frame member 40 is connected to the frame member 42 by an upper longitudinally extending plate 44. The individual frame members 40 and 42 are connected to the guides 28 and 30 by means of feet 46 at the lower corners thereof, the feet 46 resting upon the plates 34 and 36 and being secured thereto by means of bolts 48. The bolts 48 are received in slots 50 in the feet 46 to facilitate transverse shifting of the frame members 40 and 42 for a purpose to be described in more detail hereinafter.

Extending upwardly from the plate 32 adjacent opposite ends thereof are supports which include a front support 52 and a rear support 54. The supports 52 and 54 are of similar construction and have mounted on the upper ends thereof aligned bearing blocks 56 and 58, respectively. Extending between the bearing blocks 56 and 58 and journalled therein is a cross shaft 60. The cross shaft 60 extends rearwardly of the bearing block 58 for a reason to be set forth in more detail hereinafter. By the rear face of the support 52 is a journal assembly 62 in which there is journalled a shaft 64. The shaft 64 is provided at the left end thereof, as viewed in Figure 3, with a pulley 66. The pulley 66 is aligned with a pulley 68 carried by an armature shaft 70 of an electric motor 72 mounted on the plate 32. Entrained over and connecting together the pulleys 66 and 68 is a drive belt 74.

The shaft 60 adjacent the bearing block 56 is provided with a worm wheel 76. The worm wheel 76 is engaged by a worm gear 78 on the shaft 64 to effect rotation of the cross shaft 60.

Figure 3:
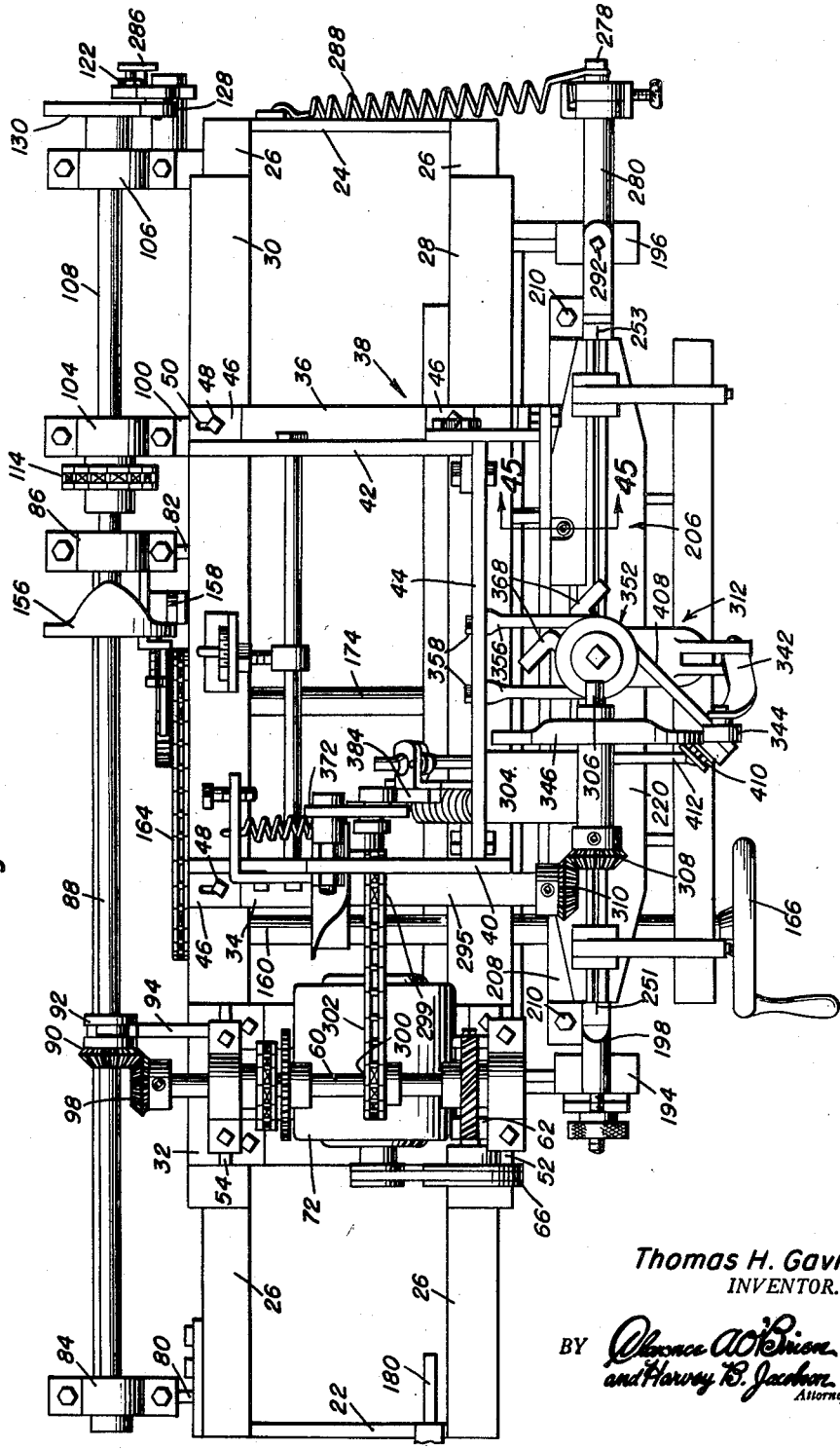
Figure 3 is a top plan view of the saw sharpening machine of Figure 1 and shows the specific relationship between the various components of the drive train for the saw sharpening machine and the specific means for actuating the punch by the elements of the drive train.

Carried by the rear wall 20 of the upper portion 16 of the base 12 is a pair of generally L-shaped support arms 80 and 82, as is best illustrated in Figures 3 and 4. Carried by the upper ends of the support arms 80 and 82 are bearing blocks 84 and 86, respectively, in which there is journalled a longitudinally extending rear shaft 88. Carried by the rear shaft 88 intermediate the ends thereof is a beveled gear 90 having a positioning collar 92. Carried by the rear surface of the support 54 is an upstanding bracket 94 which includes an upper yoke portion 96 engageable with the collar 92 to position the bevel gear 90 longitudinally of the shaft 88.

In order that the rear shaft 88 may be driven, the cross shaft 60 is provided at the rear end thereof with a bevel gear 98 which is meshed with the bevel gear 90 in driving engagement. The bevel gear 98 is movable on the cross shaft 60 to eliminate the driving of the rear shaft 88 when desired.

Referring once again to Figure 2 is particular, it will be seen that there is carried by the rear wall 20 at the left end thereof, as viewed in Figure 2, a pair of longitudinally spaced brackets 100 and 102. The bracket 100 is disposed adjacent the bracket 82 and is provided with a bearing assembly 104. The bracket 102 is disposed adjacent the end of the rear wall 20 and is provided with a bearing assembly 106 aligned with the bearing assembly 104. Suitably journalled in the bearing assemblies 104 and 106 is a lower rear shaft 108. The shaft 108 is provided at one end thereof with a sprocket 110 which is aligned with a sprocket 112 on the rear shaft 88. Entrained over the sprockets 110 and 112 is a drive chain 114 for driving the lower rear shaft 108 by the rear shaft 88.

In addition to the bearing assembly 106, the bracket 102 also includes a bearing assembly 116 which is disposed below the bearing assembly 106. Carried by the bearing assembly 116 and extending to the left therefrom as viewed in Figure 2, is a shaft 118. Mounted on the portion of the shaft 118 adjacent the bearing assembly 116 is a spacing sleeve 120. Mounted on the end portion of the shaft 118 is a lever 122 which is retained on the shaft 118 by a collar 124.

Carried by the intermediate portion of the lever 122 is a pin 126 which carries a small roller 128. Mounted on the lower rear shaft 108 adjacent the bearing assembly 106 is a cam 130 which is aligned with the roller 128. The roller 128 engages the cam 130 and is driven thereby to effect the rocking movement of the lever 122 about the shaft 118 for a purpose to be described in more detail hereinafter.

In order that the carriage 38 may be driven longitudinally along the ways 26 of the base 12, there is secured to the undersides of the plates 32, 34 and 36, a rack 132. Suitably journalled in the upper portion 16 of the base 12 is a transverse shaft 134 carrying a gear 136 meshed with the rack 132. The shaft 134 extends rearwardly of the upper portion 16 of the base 12 and is provided adjacent the rear end thereof with a sprocket 138. Also mounted on the shaft 134 at the extreme rear end thereof is a replaceable rack gear 140 which is secured to the sprocket 138 by a suitable fastener 142.

It is desired that the carriage 38 be moved by step by step movement during the shaping of a saw. In order to effect this step by step movement, there is pivotally secured to bracket 143 supported by arm 82 by means of fastener 144 the lower end of a lever 146. The lever 146 has pivotally connected to an intermediate portion thereof an intermediate portion of a horizontally disposed dog member 148, the dog member being connected to the lever 146 by a pivot 150. The dog member 148 is urged into engagement with the rack gear 140 by a leaf spring 152 carried by the dog member 148 and engaging a pin 154 carried by the lever 146.

In order that the lever 146 may be rocked to effect the driving of the rack gear 140 by the dog member 148, there is provided on the rear shaft 88 a cam which is best illustrated in Figure 31, the cam being referred to by the reference numeral 156. Carried by the extreme upper end of the lever 146 is a roller 158 which engages the surface of the cam 156. As the shaft 88 is rotated, the cam 156 will effect the rocking movement of the lever 146 to rotate the rack gear 140. Each time the rack gear 140 is rotated one tooth, the carriage 38 will be advanced along the base 12 a distance equal to the spacing of one tooth of the saw being shaped. Inasmuch as the number of teeth per inch of a saw varies depending upon the particular saw, there will be provided a plurality of the rack gear 140, each rack gear 140 being provided for the predetermined saw.

In order that the carriage 38 may be quickly returned to an initial starting position, there is carried by the upper portion 16 of the base 12 a second transverse shaft 160. The shaft 160 is provided at its rear end with a sprocket 162 which is aligned with the sprocket 138. Entrained over the sprockets 138 and 162 is a drive chain 164. The forward end of the shaft 160 is provided with a suitable hand wheel 166 to facilitate rotation thereof.

In order to permit the reversal movement of the carriage 38, it is necessary to move the dog member 148 out of engagement with the rack gear 140. This is accomplished by means of a rod 168 whose upper end is connected to a portion of the dog member 148 remote from the rack gear 140 and on the opposite side of the pivot 150 therefrom. The lower end of the rod 168 is connected to a foot pedal 170 which is pivotally mounted on the base 12 in any desired manner.

Referring once again to Figure 2 in particular, it will be seen that there is carried by the bracket 82 intermediate the ends thereof a yoke 172. The yoke 172 is provided with an adjusting screw 174 engageable with the lever 146 to limit the stroke thereof by limiting the movement of the lever 146 to the right, as viewed in Figure 2. By adjusting the screw 174, the effected stroke of the lever 146 may be varied as desired.

Referring now to Figure 4 in particular, it will be seen that there is carried by the upper edge of the end wall 22 in alignment with the rack 132 a collar 176 having an adjusting screw 178. Extending through the collar 176 is a rod 180 which is selectively positioned by the set screw 178. The rod 180 is engageable with the end of the rack 132 and limits the movement of the carriage 38 to the left, as viewed in Figure 1. Thus, after each saw shaping operation, the carriage 38 may be automatically returned to its initial starting position.

In order that a saw, such as a hand saw, may be supported for a sharpening or a shaping operation, there is carried by the front wall 18 a suitable saw support which is referred to in general by the reference numeral 182. The saw support 182 includes a pair of brackets 184 and 186 which are secured to the front wall 18 in longitudinally spaced relation. Carried by the brackets 184 and 186 are vertically disposed sleeves 188 and 190, respectively. Mounted in the sleeves 188 and 190 are vertically movable pins 192 terminating in horizontally disposed bearing blocks 194 and 196, respectively, at the upper ends thereof.

Seated in the bearing block 194 is a longitudinally disposed shaft portion 198. A similar shaft 200 is seated in the bearing block 196.

Carried by the opposed ends of the shaft portions 198 and 200 are blocks 202 and 204 which have secured thereto a vise which is referred to in general by the reference numeral 206. The vise 206 includes a first clamp member 208 which is adjustably secured to the blocks 202 and 204 by means of a plate 212. The plate 212 is secured to the undersides of the blocks 202 and 204 by fasteners 210. Depending from the plate 212 is a pair of brackets 214 which are generally U-shaped in outline, as is best illustrated in Figure 4. Carried by the forward portions of the brackets 214 and seated in the upper ends thereof are pins 216. The pins 216 are parts of brackets 218 to which a second clamp member 220 is secured.

In addition to the brackets 218, there are secured to the underside of the second clamp member 220 a pair of depending brackets 222. The brackets 222 have their lower ends seated upon cams 224 carried by a longitudinal shaft 226 whose ends are supported by the brackets 214. Carried by the shaft 226 for effecting rotation thereof is a handle 228. The cams 224 will move the lower ends of the brackets 222 in or out to move the second clamp member 220 towards or away from the fixed clamp member 208.

Carried by the plate 212 is a hook 230 which has secured thereto one end of a coil spring 232. The opposite end of the coil spring 232 is anchored to the bracket 186. The coil spring 232 thereby urges the vise 206 to the right, as viewed in Figure 1.

Movement of the vise 206 to the right or left is controlled by means of a threaded portion 234 on the shaft portion 198. The threaded portion 234 is provided with a knurled nut member 236 which engages a bearing 238 carried by a threaded portion 234. The bearing 238 in turn engages a collar 240 carried by the block 194. If desired, the collar 236 may be provided with suitable index means for determining the amount that the vise 206 is shifted.

It is pointed out at this time that the purpose of the shifting of the vise 206 is both for the final aligning of a saw to be sharpened and for permitting a progressively increasing cut upon each pass of the sharpening device over the saw being sharpened.

Once the position of the vise 206 has been finally set, the proper swinging of the vise 206 may be checked by means of a pointer which is carried by a collar 244. The collar 244 is adjustably carried by a shaft 246 which extends forwardly from the upper portion of the base 14. The collar 244 is provided with a set screw 248 to retain it in adjusted position.

The teeth of an average hand saw are not set in a straight line, but are disposed along a curved or bowed path. In order that the saw being sharpened may pass through such a path when it is either being sharpened or provided with new teeth, there is secured to the guide 28 of the carriage 38 on the underside thereof in front of the front wall 18 an elongated cam member 250. The cam member 250 has engaged therewith a follower 252 which is mounted on a pin 254 of a lever 256. The lever 256 is pivotally secured to the front wall 18 by means of a pivot 258.

Referring now to Figures 4 and 7 in particular, it will be seen that there is provided aligned pins 260 which are journalled in the brackets 184 and 186. Carried by the pins 260 in alignment with the pins 192 are rocker arms 262. The rocker arms 262 are connected together by a longitudinal bar 264 which is disposed adjacent the lever 256, as is best illustrated in Figure 9. The lever 256 is provided with a forwardly projecting finger 266 which overlies the bar 264 and controls vertical movement thereof as the guide 38 is moved longitudinally of the base 12.

Referring once again to Figure 7 in particular, it will be seen that each of the rocker arms 262 is provided with an adjustable tappet member 268 which is engaged with the lower end of its respective pin 192. Thus, the height of the vise 206 may be initially set and when as the carriage 38 is moved longitudinally of the base 12, the vise 206 will be raised or lowered so that the teeth of the saw being sharpened are moved along a curved path with respect to the sharpening device.

Referring now to Figures 3 and 45 in particular, it will be seen that the shaft portions 18 and 200 are provided with centering marks 251 and 253, respectively, which are longitudinally aligned and with which a center of a saw being sharpened should be aligned at opposite ends thereof. Inasmuch as a saw will vary in thickness, it is desirable that the fixed clamp 208 be readily adjustable. This is accomplished by adjustably securing the fixed clamp member 208 on the plate 212 by a plurality of fasteners 255. The fasteners 255 pass through slots 257 in the plate 212 and permit slight transverse adjustment of the clamp member 208. Adjustment of the clamp member 208 is facilitated by a bracket 259 caried by the plate 212, each backet 259 having a set scew 261 engageable with the clamping member 220 to effect shifting of the clamp member 208.

In order to properly sharpen a saw, it is necessary that the teeth thereof be properly positioned with respect to the vice 206. In order to accomplish this, there is provided a guide assembly which is referred to in general by the reference numeral 263. The guide assembly 263, as is best illustrated in Figure 6, includes an elongated guide member 265 which is disposed parallel to the clamp members 208 and 220 and which is supported at intermediate points by supports 267. The supports 267 are in turn supported by brackets 269 which are releasably clamped to the brackets 214.

Carried by opposite ends of the guide 265 are fittings 270 which are slidable on the guide 265. The fittings 270 are clamped in adjusted position by a set screw 272. Adjustably carried by each of the fittings 270 is a saw engageable guide member 274.

In order to effectively sharpen a saw with a file in a manner to be described in more detail hereinafter, it is desirable that the saw blade be tilted in the direction of filing. This is automatically accomplished by means of a lever 276 which is secured to the right hand end of the shaft 200, as viewed in Figure 1. The lever 276 depends from the shaft portion 200, as is best illustrated in Figure 6, and is aligned with the lever 122. The lever 276 is provided with a plurality of headed pins 278 which selectively receive a notched end of a link 282. The link 282 extends between the levers 122 and 276 and is provided at its opposite end with a notch which is selectively received over one of a plurality of headed pins 286. By varying the position of the link 282, the effective stroke of the lever 276 may be varied.

In order to prevent floating of the lever 276, there is secured to the extreme lower end thereof a tension spring 288. The opposite end of the tension spring 288 is connected to a bracket 290 carried by the end wall 24.

In order to effect proper centering of the vise 206, the lever 276 is adjusted relative to the shaft portion 200 on which it is pivotally mounted by means of a set screw 292. The set screw 292 is carried by a C-shaped bracket 294 which is rigidly secured to the shaft portion 200. Carried by the bracket 294 in opposed relation to the screw 292 is a compression spring 296. It will be readily apparent that the lever 276 drives the shaft portion 200 through the bracket 294.

In certain operations of the saw sharpening machine 10, it is not desired to rock the vise 206. When these operations are being performed, the link 282 is removed, as is best illustrated in Figure 5. Further, pivoting or rocking of the vise 206 is prevented by means of a fastener 298 which is passed down through the shaft portion 200 and threadedly engaged into the bearing block 196.

Carried by the left side of the frame member 40, as viewed in Figure 3, is a bearing assembly 295 in which there is journalled a transverse shaft 297. The shaft 297 is provided intermediate its ends with a sprocket 299 which is aligned with a sprocket 300 on the shaft 60. Entrained over the sprockets 299 and 300 and drivingly connecting the two together is a drive chain 302.

Carried by the bar 44 and projecting forwardly therefrom is a bearing assembly 304 in which there is journalled for rotation a forward longitudinal shaft 306. The shaft 306 is provided at the left end thereof, as viewed in Figure 3, with a bevel gear 308. The bevel gear 308 is meshed with a bevel gear 310 mounted on the forward end of the transverse shaft 297.

The saw sharpening machine 10 includes a plurality of attachments including a punch for forming new teeth in a saw, the punch being referred to in general by the reference numeral 312. The punch 312 includes a mounting plate 314 which has secured to the rear ends thereof by means of removable bolts 316 angle brackets 318 permanently carried by the frame members 40 and 42. By removing the fasteners 316, the punch assembly 312 may be readily removed.

The punch assembly 312 includes a mounting plate 320 which is suitably secured to the plate 314. The mounting plate 320 is provided adjacent the lower end thereof with a die 322 which is horizontally disposed. Carried by the mounting plate 320 is a bracket 324 which guidingly carries a horizontally disposed punch member 326, the cross section of the punching end of the punch member 326 being that of the space to be removed between adjacent newly formed teeth. The punch member 326 is provided with a head 328 against which there is engaged a spring 330 carried by the punch member 326 urging it to a retracted position.

The bracket 324 includes a pair of spaced ears 332 between which there is disposed the lower end of a lever 334, the lever 334 being mounted on a pivot pin 336 carried by the ears 332. The lower end of the lever 334 engages the head 328 of the punch member 326 to urge the punch member 326 into a punching cooperation with the die 322.

The bracket 324 is secured to the mounting plate 320 by numerous fasteners including a bolt 338. The bolt 338 carries one end of a tension spring 340 whose opposite end is connected to an intermediate portion of the lever 334 to urge the lever 334 away from the punch member 326.

In order that the punch 312 may be automatically operated, the lever 334 is provided with an offset upper portion 342 on which there is mounted a roller 344. The roller 344 is aligned with and engaged with a cam 346 carried by the right hand end, as viewed in Figure 1, of the shaft 306. The cam 346 is of the dual function type, as will be further described hereinafter, and the roller 344 engages the peripheral cam portion thereof, as is best illustrated in Figure 31.

When it is desired to punch the teeth in a saw, the fittings 270 are removed from the guide 264. Next the link 282 is removed and the vise 206 secured against rocking by the bolt 292. The saw to be sharpened is then clamped between the clamp members 208 and 220 in the desired position. After this has been accomplished, the carriage 38 is moved to the left end of the base 12 so that the punch member 326 is aligned with the forward end of the saw to be provided with new teeth. After the punch member 226 has been properly aligned, the stop pin 180 is positioned. By doing so, this starting position of the saw sharpening machine 10 can again be located.

After the various components of the machine 10 have been set, the electric motor 72 is energized. This results in the driving of the punch 312 by means of the cam 346 and the driving of the carriage by the gear 136 in step by step movement. It is to be understood that the driving of the carriage 38 is so timed that when the punch member 326 is in a retracted position, the carriage 38 will be advanced. After the advancement of the carriage 38 has been stopped, the punch 312 will then again be actuated by the cam 346. The size and spacing of the teeth being punched in the saw will be controlled by the punch member 326 and the rack gear 140.

After the new teeth have been punched in a saw, it is necessary that the saw be removed from the vise 206 in order that the individual teeth may be properly set. The setting of the teeth may be accomplished in any desired manner, either by hand set or by machine set. After the teeth of a saw, such as a saw 350 have been set, the saw 350 may be returned to its original position in the vise 206. The teeth of the saw 350 may be properly aligned with the upper edge of the vise 206 by replacing the fittings 270 and utilizing the guide assembly of which they form a part. Because of the use of the stop 242 and the stop pin 180, the carriage 38 may be readily aligned with the saw to be sharpened. In order to sharpen the saw, it is necessary that the punch 312 be removed and that there be secured to the carriage 38 a suitable saw sharpening attachment.

In order that saw sharpening assemblies may be attached to the carriage 38 for actuation, there is secured to the plate 44 a mounting bracket which is referred to in general by the reference numeral 352. As is best illustrated in Figures 3 and 18, the mounting bracket 352 includes a tubular member 354 which is upstanding and which is connected to the plate 44 by means of a pair of arms 356, the arms 356 being secured to the plate 44 by means of fasteners 358.

Mounted in the tubular member 354 for pivotal movement is a vertical shaft 360. The shaft 360 is suitably journalled in the tubular member by bearings, such as the bearings 362 illustrated in Figure 18. The bearings 362 are preferably of the thrust type and vertical movement of the shaft 360 down through the tubular member 354 is prevented by means of a bolt 364 which is screwed into the upper end of the shaft 360 and which carries a stop collar 366. The lower end of the shaft 360 is provided with a pair of aligned attaching flanges 368.

In order that the shaft 360 and the attaching flanges 368 may be pivoted in timed sequence to the movement of the carriage 38 along the ways 26, there is carried by the rear end of the shaft 296 a cam 370. Mounted adjacent the cam 370 is a lever 372.

Referring now to Figure 17 in particular, it will be seen that the frame member 40 is provided at the upper end thereof with an oppositely and rearwardly curved mounting plate 374 which is secured to the frame member 40 by means of fasteners 376. The lever 372 is pivotally connected to the plate 374 by means of a pivot 378 and depends therefrom.

Carried by an intermediate portion of the lever 372 is a forwardly projecting ear 380 which carries a pivot pin 382. Mounted on the pivot pin 382 is a roller 383 which engages the cam 370 to effect pivoting of the lever 372.

Also carried by the frame member 40 is a lever 384. The lever 384 is mounted on the frame member 40 by means of a plate 386 which is secured to the frame member 40 through fasteners 388. The lower end of the lever 384 is pivotally connected to the plate 386 by means of a pivot 390.

The lever 384 is disposed slightly to the right of the lever 372, as viewed in Figure 3, and it is engaged by a roller 392, the roller 392 being carried by a pivot 394 adjacent the lower end of the lever 372. The roller 392 is adjustably mounted by varying the position of the pivot 394 to vary the movement of the lever 372.

Carried by the frame member 40 and extending rearwardly therefrom is an L-shaped bracket which is referred to in general by the reference numeral 396. The bracket 396 includes a rearwardly extending flange 398 and a longitudinally extending rear flange 400. Aligned with the flange 400 and disposed forwardly thereof is a bracket 402 carried by an intermediate portion of the lever 384. Extending between the bracket 302 and the flange 400 is a tension spring 404 which urges the lever 384 into engagement with the roller 394 and at the same time urges the roller 384 into engagement with the cam 370. Rearward movement of the lever 384 is controlled by an adjustable set screw 406 carried by the flange 400.

As is best illustrated in Figures 3 and 31, there is secured to the lower end of the shaft 360 a forwardly extending arm 408. The arm 408 has carried by the forward end thereof a universal fitting 410 to which there is connected a rearwardly extending rod 412. The rear end of the rod 412 is connected to the upper portion of the lever 384 by means of a universal fitting 414. Thus through the use of the levers 372 and 374 and the cam 370, the shaft 360 is oscillated. It is to be understood that the oscillation of the shaft 364 will be in timed sequence to the advancement of the carriage 38 along the ways 26.

Referring now to Figure 11 in particular, it will be seen that carried by the upper portion of the tubular member 354 is a dial 416. Associated with the dial 416 is a pointer 418 which is carried by the washer 366 which in turn is attached to the shaft 360. By utilizing the adjustable stop screw 406, the swing of the shaft 360 may be centered as desired.

Referring now to Figure 18 in particular, it will be seen that there is carried by the plate 44 in alignment with the tubular member 354, an upstanding bar 420. The bar 420 is secured to the plate 44 for removal therefrom by a pair of fasteners 422. Suitably secured to the lower portion of the bar 420 by welding or the like is a spacer 424 which carries a forwardly extending journal pin 426. The upper portion of the bar 420 carries a relatively long forwardly extending journal pin 428, the journal pins 426 and 428 being vertically aligned.

Pivotally mounted on the journal pin 426 is an upstanding lever assembly which is referred to in general by the reference numeral 430. The lever assembly 430 includes a rearwardly disposed lever 432 and a forwardly disposed lever 434, the levers 432 and 434 being connected together by an intermediate block 436 which serves to form a journally H-shaped outline assembly. However, the lever 434 extends vertically beyond the upper end of the lever 432.

Carried by the lever 432 on the forward face thereof at the upper end thereof is a roller 438. The roller 438 is engaged with an end cam face 440 on the cam 346.

The upper portion of the lever 434 is slotted as at 442. Adjustably secured to the slotted portion of the lever 434 is a block 444 which has an aligning pin 446 and a fastener 448 passing through the slot 442 and clamping the block 444 to the lever 434. Mounted on the forward face of the block 444 is a roller 450.

Depending from the pivot pin 424 is a lever 452. The lever 452 includes a sleeve portion 454 which is journalled on the pivot pin 424 and which is positioned thereon by means of a pair of collars 546. Removably secured to the rear face of the lever 452 adjacent the lower end thereof by means of fasteners 458 is an angle member 460 which presents a rearwardly extending flange 462 against which the roller 450 bears.

Referring now to Figure 10 in particular, it will be seen that the lower end of the lever 452 is provided with a mounting flange 464 to which there is secured a plate 466. The plate 466 includes an arcuate edge 468 which has a curvature the center of which lies at the center of the shaft 360. Further, it is to be noted that the center of pivot of the lever 452 is disposed vertically above and in alignment with the center of the shaft 360. At this time, it is also pointed out that it is necessary that the center of the shaft 360 intersects the plane of the saw to be sharpened.

The carriage 38 is shifted by means of a nut member 465 carried by a shaft 567 extending between the frame members 40 and 42. Threadedly engaged with the nut member 465 is a screw 469 carried by a bracket 471 mounted on the guide 30. Movement of the carriage 38 is determined by using a dial 473 mounted on the screw 469.

Screw 472 limits the swing of plate 466, and permits selecting amount of time the grinding wheel is in contact with the saw. When grinding a very dull saw the contact would be longer than when making the finish round or pass. If the roller 438 is in continual contact with the cam 346, it will move upwardly after reaching the downward limit. If the screw 492 is set to prevent the roller from reaching the bottom of the cam 346, the contact between grinding wheel and saw would be longer.

In order to limit swinging of the plate 466, there is carried by the lever 432 a bracket 470 which is provided with an adjustable stop screw 472, as is best illustrated in Figure 10. The adjustable stop screw 472 is engageable with a right side edge, as viewed in Figure 10, of the bar 420.

Referring now to Figures 10 through 16, inclusive, it will be seen that there is illustrated the details of a grinding attachment which is referred to in general by the reference numeral 474. The grinding attachment 474 includes a frame plate 476 which is attached to the mounting flanges 386 of the shaft 360 by means of a mounting plate 478. The mounting plate 478 is provided with apertures 480 through which there are passed fasteners 482 threadedly engaged in the mounting flanges 368. The fasteners 482 are slightly smaller than the apertures 480 and in order to provide for proper alignment of the grinding attachment 474, there is carried by one end of the attaching plate 474 a pair of ears 484 and 486 which are disposed at right angles to each other. The ears 484 and 486 carry adjusting screws 488 and 490, respectively, which engage one of the mounting flanges 368 to align the mounting plate 478 therewith.

Secured to the forward face of the frame plate 476 is a second plate 492. The plate 492 is mounted for pivotal movement by means of a pivot pin 494 passing through the lower corners of the plates 476 and 492. The plate 492 is further connected to the plate 476 for pivotal movement by means of a fastener 496 which passes through an elongated arcuate slot 498 forming the plate 476. The fastener 496, as is best illustrated in Figure 14, is provided with a spring 500 disposed between a pair of washers 502 and 504. Thus the plate 492 is mounted for pivotal movement with respect to the frame plate 476, the pivotal movement being generally in a vertical plane.

Secured to the front face of the plate 492 in the center thereof is a vertically extending dovetail member 510. Disposed immediately forwardly of the dovetail member 510 is a plate 512. The plate 512 has secured to the inner surface thereof a pair of vertically extending, transversely spaced plates 506 which have opposed edges so beveled to form a dovetail slot 508. The dovetail slot 508 is of a size to snugly receive the dovetail plate 510, yet permit the guided vertical movement thereof.

Secured to the front face of the plate 512 is a pair of transversely spaced, forwardly etxending journal assemblies 514. Rotatably journaled in the journal assemblies 514 is an arbor shaft 516. Carried by one end of the arbor shaft 516 is a drive pulley 518. Adjustably clamped to the opposite end of the arbor shaft 516 is a grinding wheel 520.

In order to control vertical adjustment of the grinding wheel 520 by means of the dovetail connection between the plate 512 and the plate 492, there is carried by the plate 512 an upwardly extending angle bracket 522 which includes a forwardly extending horizontal flange 524. Also secured to the upper end of the dovetail member 510 is an angle bracket 526 which includes a forwardly extending flange 528. Carried by the flange 528 for rotation is an adjusting screw 530 which is threaded through the flange 524 and which is provided with a jamb nut 532 which bears against the lower surface of the flange 524 to lock the screw 530 in an adjusted position.

In order to control longitudinal shifting of the grinding wheel 520 for a purpose to be described in more detail hereinafter, there is carried by the forward surface of the plate 512 adjacent the lower edge thereof a bracket which is referred to in general by the reference numeral 534. The bracket 534 includes a flange 536 which is disposed in face to face engagement with the plate 512 and which is provided with an elongated slot 538 through which passes a fastener 540 secured to the plate 512. This permits longitudinal shifting of the bracket 534.

The bracket 534 also includes a forwardly extending vertical flange 542 which has a bifurcated upper portion passing around the arbor shaft 516, as is best illustrated in Figure 13. Disposed on opposite sides of the flange 542 are thrust washers 544 which, if deemed necessary, may be in the form of thrust bearings. Disposed on opposite sides of the thrust washers 544 and carried by the shaft 516 are suitable collars 546. By adjusting the bracket 534, the shaft 516 and the grinding wheel 520 may be shifted longitudinally with respect to the journal assemblies 514.

Referring now to Figure 12 in particular, it will be seen that there is secured to the front face of the plate 492 a vertically extending arm 548. The arm 548 has pivotally secured to the upper portion thereof by means of a pivot pin 550 an extension 552. The extension 552 is provided with a transverse collar 554 which engages the curved edge 468 of the plate 466. The extension 552 is adjustable, with respect to the arm 548 by means of an adjusting screw 556 carried by the flange 558 extending forwardly from the upper part of the arm 548, the end of the adjusting screw 556 engaging in an edge of the extension 552.

As is best illustrated in Figure 15, the arm 548 is provided adjacent the lower end thereof with a rearwardly extending flange 560 which carries an adjustable stop screw 562. The adjustable stop screw 562 engages an edge of the plate 476 to limit pivoting of the plate 492 with respect to the plate 476.

In order that the shaft 516 and the grinding wheel 520 may be rotated, there is provided a second electric motor 564. The electric motor 564 includes a base 566 which is mounted on a suitable bracket 568. The bracket 568 is removably secured by means of fasteners 570 in the frame member 142.

The electric motor 564 includes an armature shaft 572 on which there is mounted a drive pulley 574. The pulleys 574 and 518 are vertically aligned and have entrained thereover a drive belt 576.

In the operation of the grinding attachment 474, the saw 350 to be sharpened is mounted in the vise 206 in the manner described heretofore. It is to be understood that in the event the saw 350 has been previously provided with new teeth by means of the punch 312, that the starting position of the saw 350 with respect to the grinding wheel 520 will be the same as the starting position of the saw 350 with respect to the punch 312, in order that all operations upon the saw 350 may be the same as heretofore so that the contour of the various teeth will remain the same.

After a saw 350 has been properly mounted in the vise 206 and the carriage 38 moved to its starting position by means of the previously described stops, the saw 350 is ready to be ground. Inasmuch as the bevel of the teeth of the saw 350 is alternating with opposite teeth, it is necessary that the grinding wheel 520 be pivoted transversely of the saw 350 intermediate the grinding operations. Also, in order to provide for transverse bevel of the teeth of a saw and to effect a filing operation as the saw is ground, it is desirable that the center of the grinding wheel be alternatingly shifted from one side of the saw 350 being ground to the opposite side, as is best illustrated in Figures 39 through 44, inclusive. It is to be understood that the offsetting of the center of the circular say 350 and the amount that the circular saw is pivoted will vary depending upon the particular saw blade. The angular pivoting of the grinding wheel 520 will be controlled by controlling the pivot of the shaft 360. The offsetting of the center of the grinding wheel 520 with respect to the center of the saw 350 will vary depending upon the amount the center of the grinding wheel 520 is shifted with respect to the center of the shaft 360. This is accomplished by shifting the shaft 516 through the journal assemblies 514 in the manner heretofore described.

In addition to the pivoting and shifting of the center of the grinding wheel 520, it is also necessary that the grinding wheel 520 be periodically raised with respect to the saw 350 in order to clear the teeth of the saw 350 during the shifting of the saw in preparation for the grinding of the next teeth. This is accomplished by the action of the plate 466 on the follower 554 to pivot the plate 492 with respect to the plate 476. The amount of pivot can be controlled by adjusting the screw 556. Further, the pressure contact between the grinding wheel 520 and the teeth of the saw 350 to be sharpened may be varied by adjusting the screw 556. If the follower 554 loosely engages the plate 466 when the grinding wheel 520 were in a lowered position, then the entire weight of the parts carried by the plate 492, including the weight of the plate 492 would be brought to bear on the saw 350 by the grinding wheel 520. By properly adjusting the screw 556, a portion of that weight may be carried by the plate 466.

When the grinding attachment 474 is utilized, the vise 206 is strained against pivotal movement although it will move up and down so that the teeth being sharpened will retain their normal curved relation. Thus the saw 350 being sharpened will be retained in a vertical position at all times, as is clearly illustrated in Figures 39, 40 and 43. In an initial sharpening operation, it is necessary that the angle of the grinding wheel 520 be the same as the angle bevel on the particular tooth first being ground. This is determined by the drive train of the machine 10. In order that the proper clearance between adjacent teeth may be ground, the grinding edge of the grinding wheel 520 is beveled as at 578.

Assuming the position of the grinding wheel 520 illustrated in Figures 10, 11 and 39 as being the initial position, the grinding wheel 520 engages the forwardmost teeth of the saw 350 and proceeds to grind away the front cutting face of the forwardmost tooth. After a predetermined grinding time, determined by the various parts of the drive train of the machine 10 and the surfaces of the various cams, the grinding wheel 520 is elevated with respect to the saw 350 so as to clear the teeth thereof. This is accomplished in the manner previously described. Simultaneous with the elevation of the grinding wheel 520 the entire grinding attachment 474 is pivoted so that the grinding wheel 520 assumes the reverse angle with respect to the saw 350, as is best illustrated in Figures 43 and 44. While the grinding wheel 520 is being elevated, pivoted and lowered, the carriage 38 is being driven, in the manner previously described, so that the grinding wheel 520 will be aligned with the front face of the next tooth. This of course is determined by the proper size of rack gear 140. When the grinding wheel 520 drops in between the first and second teeth of the saw 350, it grinds not only the front face of the second tooth, but also the back of the first tooth to provide the proper clearance angle on that tooth.

After the proper grinding time on the second tooth of the saw 350, the grinding wheel 520 is again elevated and pivoted. At the same time, the carriage 38 is advanced so that the grinding wheel 520 comes in line with the third tooth of the saw 350. It is now back in its original angular position illustrated in Figures 10, 11, 39 and 40. In other words, the grinding operations on the teeth 1, 3, 5, 7, etc. will be the same and the grinding operation on the teeth 2, 4, 6, 8, etc. will be similar, yet opposite from the angle of bevel. It is to be once again noted that the center of the grinding wheel 520 shifts from one side of the saw 350 to the other as the angle of the grinding wheel is alternated so that there will be filling operation and a transverse bevel on the teeth. This method of forming the teeth of circular saws eliminates the danger of lumber being kicked back when being sawed.

It is to be understood that a single pass of the grinding wheel 520 on the teeth of a saw may not be sufficient to properly sharpen the teeth. If it is desired to make more than one pass on the grinding wheel 520, after the grinding wheel 520 has ground all of the teeth of the saw, 350, the carriage 38 is then returned to its starting position by means of the hand wheel 166 and is perfectly aligned with the saw 350 by the stop screw previously described. Then by turning the adjusting nut 236 on the vise 206, the vise 206 and the saw 360 may be advanced a desired amount, the amount preferably being that taken off in a grinding operation, so that a further grinding of the saw 350 may be effected. This process is repeated until such time as it is visually determined that the saw has been properly ground.

Although the grinding attachment 474 has been specifically described for sharpening hand saws, such as the saw 350, it is to be understood that the use thereof is not so limited. It may be utilized in the grinding of circular saws in the manner to be described hereinafter, there being necessitated a special mounting for the circular saw in order to effectively grind the same.

The grinding attachment 474 may also be utilized in the sharpening of circular saws. However, in order to sharpen a circular saw, certain changes must be made in the saw sharpening machine. These changes include the removing of the vise 206 which is accomplished by lifting the entire assembly which includes the vise 206 off of the base of the saw sharpening machine. This is accomplished by merely pulling the pins 192 out of the sleeves 188 and 190 of the brackets 184 and 186.

Inasmuch as a circular saw is rotated during a sharpening operation, it is not desired to advance the carriage 38 during the sharpening of a circular saw. Accordingly, the drive for the carriage is disconnected. This is best accomplished by sliding either the gear 98 or the gear 90 on its respective shaft so that the rear shaft 88 is not driven.

In order to properly support a circular saw for a sharpening operation by the grinding wheel 520, it is necessary to mount on the guides 28 and 30 a supporting frame which is referred to in general by the reference numeral 580. The frame 580 includes a pair of transversely extending straps 582 and 584 which are disposed adjacent the plates 34 and 36, respectively, and are removably secured to the guides 28 and 30 by suitable fasteners 586. The straps 582 and 584 terminate in depending flanges 588 at the forward ends thereof. The flanges 588 are disposed forwardly of the base 12 and have secured to the forward surfaces thereof at the lower ends thereof a longitudinal bar 590. Adjustably clamped on the bar 590 intermediate the ends thereof and generally in alignment with the grinding wheel 520 is a vertical bar 592. The bar 592 is provided on the rear surface thereof adjacent the upper end thereof with suitable lugs 594 which are spaced apart a considerable distance. Connected to the lugs 594 by means of fasteners 596 is a rear strap 598. The strap 598 clamps the bar 590 against the rear surface of the bar 592 to retain the bar 592 in an adjusted position.

The bar 592 is provided with a plurality of vertically spaced internally threaded bores 600 in which there is selectively positioned a fastener 602 carrying a washer 604. Slidably received over the fastener 602 is a bifurcated lower end portion of a circular saw support arm 606, the lower end of the support arm 606 being provided with a slot 608 in which the fastener 602 is received. The saw support arm 606 is pivotable about the fastener 602 and is clamped in any desired position thereby.

Carried by the upper end of the support arm 606 is a backing member 610 which has carried thereby a forwardly extending shaft 612. The shaft 612 is of a size to be received in the smallest shaft hole customarily found in circular saw blades, such as the saw blade 614. Removably carried by the shaft 612 is a second backing member 616 which is retained in place by a set screw 618. The two backing members 610 and 616 effectively clamp the circular saw blade 614 on the shaft 612, and at the same time permits rotation thereof about the shaft 612. It is to be understood that the shaft 612 will be provided with suitable bushings to fit all size of saw shaft openings.

In order that that portion of the saw blade 614 adjacent the teeth being sharpened by the grinding wheel 520 may be suitably braced, there is provided a longitudinal bar 620. The bar 620 is provided at its opposite ends with mounting brackets 622 which are secured to the flanges 588. Carried by an intermediate portion of the bar 620 is an upwardly disposed flange 624 which carries an adjustable set screw 626. Aligned with the set screw 626 is a fixed backing screw 628 which cooperates with the set screw 626 to form a firm backing for the circular saw blade 614, but at the same time permits rotation thereof.

In order to advance the circular saw 614 so that adjacent teeth may be sequentially sharpened, there is provided a transverse shaft 630 which overlies the strap 582. Carried by the strap 582 are suitable bearing assemblies 632 and 634 in which the shaft 630 is journalled.

The rear end of the shaft 630 is provided with a sprocket 636 adjacent the bearing assembly 632. The sprocket 636 is aligned with a sprocket 638 on the shaft 630. Entrained over the sprockets 636 and 638 and drivingly connecting together the two is a drive chain 640. The drive chain 640 normally rides directly upon the shaft 60 and is inoperative in other operations of the saw sharpening machine 10.

Pivotally connected to the bar 590 by means of a pivot 642 is a lever 644 which includes an arcuate upper portion 646. The arcuate portion 646 is concaved to the right, as viewed in Figure 26 and is provided with an intermediate ear 648 projecting to the left. Carried by the ear 648 is a roller 650 which engages a cam 652 carried by the shaft 630 at the forward end thereof. As the shaft 630 rotates, the cam 652 engages the roller 650 to effect the oscillatory movement of the lever 644 about the pivot 642.

Carried by the bar 590 is a second upstanding lever 654. The lever 654 is pivotally connected to the bar 590 by means of a pivot 656. The lever 654 includes an upper portion 658 which is offset to the left, as viewed in Figure 26. Pivotally connected to the lower part of the offset portion 658 is a link 660. The opposite end of the link 660 is pivotally connected to the curved upper portion 646 of the lever 644 by means of a pivot fastener 662. The pivot fastener 662 is selectively positioned in one of a plurality of apertures 664 formed in the curved portion 646. By varying the position of the pivot fastener 662, the effective stroke imparted to the lever 664 from the lever 644 by the straps 660 may be varied. This will compensate for the variation in the spacing and size of the teeth of various circular saw blades.

Connected at one end to the bar 590 is a tension spring 666. The opposite end of the tension spring 666 is connected to an extension 668 of the lever 654, the extension 668 being pivotally connected to the lever 654 by a pivot fastener 670. The spring urges the upper end of the extension 666 to the left for a purpose to be described in more detail hereinafter.

Carried by the upper portion of the extension 668 is a shaft 672 having a transverse bore in which there is received a depending rod 674. The rod 674 is clamped in an adjusted position by means of a set screw 676. The lower end of the rod 674 is offset as at 678 for engagement with teeth of the circular saw blade 614.

The shaft 672 is rotatably journalled in the extension 668 and is provided adjacent its rear end with a depending pin 680. The pin 680 has connected thereto a tension spring 682 whose opposite end is suitably anchored. The spring 682 urges the end 678 of the rod 674 into engagement with the circular saw blade 614, but permits pivotal movement of the shaft 672 so that the end 678 may ride over the teeth of the circular blade 614 during a reverse movement of the extension 668.

The pivoting of the extension 668 with respect to the lever 654 is limited by means of an adjustable stop 684 carried by the offset portion 658 of the lever 654. This adjustable stop 684 may also be utilized to vary the effective stroke of the rod 674 in a circular saw blade rotating operation.

From the foregoing description of the means for rotating the circular saw blade 614, it will be seen that the cam 652 causes pivotal movement of the lever 644. The lever 644 through the link 660 causes pivoting of the lever 654. The lever 654 through the stop screw 684 causes pivoting of the extension 668 in the movement of the rod 674 to a saw blade advancing position. All of these components are returned to their initial position by the spring 666.

Referring now to Figures 26 and 29 in particular, it will be seen that the connection between the bars 592 and 590 is such that limited vertical movement of the bar 592 is permitted. In order that this vertical movement may be controlled, there is carried by the bar 592 between the ears 594 a rearwardly extending pin 686 which has the rear portion thereof supported by the strap 598. Pivotally carried by the pin 686 is a lever 688. The lever 688 has the left end thereof engaged on the upper edge of the bar 590. Carried by the right end thereof, as viewed in Figure 26, is an adjustable stop screw 690. The adjustable stop screw 690 engages the upper edge of the bar 590 and when properly adjusted will permit a small advancement of the bar 592 vertically. This minute vertical adjustment of the bar 592 permits a slight vertical adjustment for the circular saw blade 614 so that it may be progressively fed into the grinding wheel 520. The adjustable stop 684 also controls the position of the circular saw blade 614 with respect to the grinding wheel 520 to control the amount that is being ground and the progressive grinding operation of the circular saw blade 614 by the grinding wheel 520.

The function of the grinding wheel 520 will be the same with respect to the circular saw blade 614 as described above with respect to the hand saw 350. The only difference in the grinding operation is that when the grinding wheel 520 is pivoted upwardly out of engagement with the teeth of the circular saw blade 614 in lieu of the entire carriage 38 being advanced to move the grinding wheel 520 with respect to the teeth of the saw blade, the circular saw blade 614 is rotated. Accordingly, the means for rotating the circular saw blade 614 must be timed sequence with the operation of the grinding attachment 474. This of course is accomplished by a proper synchronization of the drive train of the saw sharpening machine 10. It is also pointed out that the grinding wheel 520 may have to be replaced when utilized in conjunction with a circular saw blade for sharpening the same.

Referring now to Figures 19 through 25, inclusive, it will be seen that there are disclosed the details of a filing attachment which is referred to in general by the reference numeral 692. The filing attachment 692 is supported from the shaft 360 and is pivoted in the same manner as is the grinding attachment 474 when it is being utilized in the grinding of a hand saw. When the filing attachment 692 is utilized, it is necessary that all parts of the saw support 182 are utilized. That is, the vise 206 will be utilized to clamp a saw, the vise will be raised and lowered as the carriage 38 progresses along the saw in order that the proper curvature may be filed in the teeth, and the vise 206 will be rocked about a longitudinal horizontal axis in order to properly position the saw, such as the saw 350, for filing.

The filing attachment 692 includes an inverted U-shaped frame which is referred to in general by the reference 694 and is best illustrated in Figure 21. The frame 694 includes an upper web member 696 which has converging downwardly therefrom upper leg portions 698. Formed integrally with the lower portions of the upper leg portions 698 are depending legs 700, the legs 700 being disposed in spaced parallel relation. Secured to the web member 696 and the upper leg portions 698 is a mounting flange 702. The mounting flange 702 is disposed in face-to-face engagement with the mounting flanges 368 of the shaft 360 and is secured thereto by means of suitable fasteners 704.

Secured to the upper surface of the web member 696 and extending upwardly therefrom is a bracket 706, the bracket being secured to the web member 696 by means of fasteners 708. The upper end of the bracket 706 supports a suitable journal 710 in which there is rotatably mounted a shaft which is provided at the left end thereof, as viewed in Figures 19 and 20, with a universal fitting 712 and at the right end thereof with a sprocket 714, the sprocket 714 being secured in place by a fastener 716. The universal fitting 712 is connected to an extension of the shaft 306 which passes through the cam 346.

Extending transversely between the legs 700 is a support plate 717 which carries in the central portion thereof a suitable journal 718, as is best illustrated in Figure 24. Rotatably journalled in the journal 718 is a shaft 720 which is provided at one end with a sprocket 722. The sprocket 722 is secured on the shaft 720 in an adjusted position by means of a set screw 724 and is retained on the shaft 720 by means of a fastener 726. The sprocket 722 is aligned with the sprocket 714 and is connected thereto by a drive chain 728. The sprocket 722 is spaced from the journal 718 by means of a thrust washer 730.

Suitably keyed on the opposite end of the shaft 720 is a cam assembly which is referred to in general by the reference numeral 732. The cam assembly 732 includes a hub 734 which is secured to the shaft 720. Extending outwardly from the hub 734 is a plate 736 which has formed on a rear surface thereof a cam 738. Carried by a forward surface of the plate 736 is a crank pin 740.

The filing attachment 692 includes a horizontally disposed track member 742 which is of a dovetailed cross section and which is disposed in spaced parallel relation with respect to the frame member 694. Secured to the rear surface of the track member 742 adjacent the opposite ends thereof is a pair of rearwardly extending angulated arms 744 and 746. The arms 744 and 746 each includes a mounting flange 748 which is secured to the rear surface of the track member 742 by means of a suitable fastener 750, as is best illustrated in Figure 25. The arms 744 and 746 are pivotally connected to lower ends of the legs 700 by means of aligned pivots 752. In this manner, the track member 742 is mounted for pivotal movement.

In order to control the vertical pivotal movement of the track member 742, there is pivotally connected to the frame 694 by means of the pivot fasteners 752 a yoke 754 which is best illustrated in Figure 21. Carried by the upper portion of the yoke and secured thereto by means of a fastener 756 is a mounting plate 758. Carried by the mounting plate 758 is a pin 760 on which there is mounted a roller 762. The roller 762 engages the cam 738 to effect oscillatory movement of the yoke 754.

Referring now to Figure 25 in particular, it will be seen that in order to connect the yoke 754 to the track member 742 for effecting vertical oscillation thereof, there is disposed at the rear edge of the leg 700 a flange 766. Carried by the flange 766 is an adjustable stop screw 768 haivng a locking nut 770. The stop screw 768 engages the yoke 754 continuously and as the yoke 754 is pivoted or oscillated by the movement of the cam 738, a like movement is transmitted to the track member 742 through the arm 744. A stop screw 764 is carried by the plate 717 in alignment with the screw 768.

In order that the stop screw 768 may be retained in engagement with the yoke 754, the arm 744 is provided with an upwardly disposed extension 772 which is best illustrated in Figures 21 and 23. The extension 772 has connected thereto a rear end of a tension spring 774 whose forward end is connected to the frame member 694.

Suitably carried by the track member 742 for sliding movement thereon is a carriage 776. The carriage 776 is provided in the rear surface thereof with a dovetailed shaped recess 778. The recess 778 is of a larger size than the track member 742 and permits the snapping of the carriage 776 directly over the track member 742. The carriage 776 is retained on the track member 742 in guided relation by means of a filler strip 78 which is retained in place by suitable fasteners 782.

Disposed at opposite ends of the carriage 776 in depending relation are arms 784. The arms 784 have bosses 785 carrying opposed sleeves 786 which receive ends of a special triangular file which is referred to in general by the reference numeral 788. The ends of the files 788 are journalled in the sleeves 786 which are in turn positioned by means of set screws 790 carried by the bosses 785.

In order to effect reciprocation of the carriage 776 along the track member 742, there is secured to the rear surface of the carriage 776 a pair of vertically disposed, transversely spaced guide members 792. The guide members 792 are spaced apart a distance to snugly receive the crank pin 740. Thus as the cam assembly 732 is rotated, the crank pin 740 will continuously engage the guide members 792 and cause reciprocation of the carriage 776 along the track member 742.

When it is desired to sharpen the teeth of the saw 350, the saw 350 is mounted in the vise 206 in the same manner described above as a preparatory step in the grinding of the teeth to sharpen them. The carriage 38 is then run to the left end of the base 12 to properly position the file 788 with respect to the first tooth of the saw 350. Inasmuch as adjacent teeth are beveled in opposite directions, it is necessary that the angular disposition of the file 78 be the same as that of the bevel of the face of the first tooth of the saw 350. Also, it is necessary that the cam assembly 732 be properly synchronized with the remainder of the drive train of the saw sharpening machine 10. This is accomplished by properly connecting the universal fitting 712 to the shaft 306. Once this has been accomplished, the electric motor 72 may be energized to start the operation of the saw sharpening machine 10.

Referring now to Figures 33 through 38, inclusive, it will be seen that during a saw sharpening operation the file 788 will be retained in a horizontal position at all times. However, the saw blade 350 will be tilted in the direction of movement of the file 788. By so tilting the saw 350, the proper transverse beveling and filing of the teeth being filed will be automatically accomplished. As previously described, the slope of the saw blade 350 will be determined by the teeth of the saw blade.

As is best illustrated in Figure 33, an initial movement of the file 788 may be considered as in the direction to the right. During this initial movement the file 788 is lowered and is in the desired pressure contact with the tooth of the saw 350 being filed. The file 788 is disposed in angular relationship with the longitudinal axis of the saw 350 so as to place the proper bevel on the teeth being sharpened. This is best illustrated in Figure 34.

The file 788 is moved to the right approximately one-half of a stroke at which time the cam surface 738 will result in the elevation of the file 788 above the saw 350, as is best illustrated in Figure 35. Simultaneous with the raising of the file 788, the entire filing apparatus 692 will be pivoted with the shaft 360 and the vise 206 will also be pivoted. An intermediate point in the stroke of the file 788 will show the file 788 elevated above the saw 350, the saw 350 being vertically disposed and the file 788 being disposed normal to the axis of the saw 350. At the same time, the carriage 38 will be in the state of being advanced so that the next adjacent tooth of the saw 350 may be moved into position for engagement by the file 788.

In Figures 37 and 38, there is illustrated the final position of the file 788 and the saw 350 at the end of the initial stroke of a file 788 to the right. At this time the saw 350 has been pivoted to a position opposite that of Figure 33 and the file 788 is disposed at an opposite angle to the saw 350 from that illustrated in Figure 34 so that the bevel of the next adjacent tooth will be opposite from that of the preceding tooth of the saw 350. When the file 788 is in the position of Figures 37 and 38, it is now ready to be moved to the left in order that it may file the next tooth of the saw 350. It is to be noted that once again the saw 350 is angled or tilted in the direction of movement of the file 788 in its sharpening operation. Thus the finished teeth of the saw 350 will be similar, but of opposite bevel.

It is to be understood that normally the saw 350 will not be sharpened in a single pass of the filing attachment 692, but that three or four passes may be necessitated. In order that the proper engagement between the file 788 and the teeth of the saw 350 may be assured, in the subsequent filing operations, the saw 350 is advanced a slight amount by advancing the vise 206 in the manner previously described.

The pressure contact between the file 788 and the teeth of the saw 350 may be varied as desired. This is accomplished by adjusting the position of the stop screw 768. If the stop screw 768 were moved to a totally released position, the entire weight of the track member 742, the arms 744 and 746, and the carriage 776 together with the articles carried thereby would be placed upon the teeth of the saw 350 by the file 788. Further, the tension spring 774 would be effective in causing additional pressure contact between the file 788 and the teeth of the saw 350. Therefore, by adjusting the stop screw 768 so that the yoke 754 carries a desired proportion of the weight of the various parts, the pressure contact between the file 788 and the teeth of the saw 350 may be varied.

Referring now to Figure 32 in particular, it will be seen that the file 788, while it is a triangular file, is not of the conventional type. Inasmuch as half of the file 788 is utilized in the filing in one direction and the other half is utilized in filing in the opposite direction, the teeth of the file 788 are formed in two groups, the groups being referred to by the reference numeral 796 and 798. It is to be noted that the teeth of the group 796 slope in a different direction from the slope of the teeth of the group 798. In each instance, the teeth of the particular group slope in the general direction of travel of the particular portion of the file 788 in a filing operation. They also slope downwardly so that when the file 788 is engaged with teeth of the saw 350, the file 788 will have a tendency to dig into the teeth of the saw 350 rather than being urged upwardly so as to ride on the teeth and have a chattering action. By utilizing a file, such as the file 788, a maximum efficiency of the filing operation is possible.

From the foregoing description of the operation of the filing attachment 692, it will be readily apparent that the attachment is of such a nature whereby hand filing of a saw is duplicated and at the same time all possibilities of human error, as is found in hand filing is eliminated by utilizing a machine for accomplishing the filing. This is accomplished not only by the pivoting of the file 788 with respect to the saw 350 between adjacent teeth, but also by tilting the saw 350 in the direction of the movement of the file 788 during a filing operation.

From the foregoing description of the present invention, it will be readily apparent that there has been devised a saw sharpening machine which utilizes a basic framework and drive train which may be easily converted for use with various attachments whereby the machine, as converted by the various attachments, can be utilized in the punching of new teeth on a saw, the filing or grinding of the teeth of a hand saw and the grinding of teeth of a circular saw. Further, the operation of the saw filing machine 10 is such that the grinding or filing operation produces that shape of tooth which is most effective and the teeth which are sharpened are all of the same shape and pattern and may be disposed along a curved path in the case of a hand saw as is desired. Further, the operation of the machine is such that once a saw has been properly positioned therein through a minor adjustment, repeated passes may be made on the saw during sharpening operations with the saw being accurately positioned with respect to the sharpening member during each subsequent paths of the sharpening member with respect to the teeth of the saw.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A saw tooth shaping device comprising a base, a saw support carried by said base, a carriage mounted on said base for longitudinal movement therealong, a tooth shaping device carried by said carriage, drive means carried by said carriage for effecting step by step movement of said carriage, drive means selectively moving the same to operative and inoperative positions, said drive means being in timed relation whereby said carriage is moved when said tooth shaping means is in said inoperative position, said saw support being mounted for movement towards said tooth shaping device, a cam track carried by said carriage, a follower engaged with said cam track, means connecting said follower to said saw support whereby said saw support is raised and lowered in response to movement of said carriage along said base to form teeth along a curved path.

2. A saw tooth shaping device comprising a base, a saw support carried by said base, a carriage mounted on said base for longitudinal movement therealong, a tooth shaping device carried by said carriage, drive means carried by said carriage for effecting step by step movement of said carriage, drive means selectively moving the same to operative and inoperative positions, said drive means being in timed relation whereby said carriage is moved when said tooth shaping means is in said inoperative position, said saw support including a pair of spaced mounting members secured to said base, each of said mounting members including vertical sleeves, a saw clamp, pins carried by said saw clamp slidably mounted in said vertical sleeve, a cam track carried by said carriage, a follower engaged with said cam track, means connecting said follower to said pins whereby said pins are raised and lowered in response to movement of said carriage along said base to form teeth along a curved path.

3. A saw tooth shaping device comprising a base, a saw support carried by said base, a carriage mounted on said base for longitudinal movement therealong, a tooth shaping device carried by said carriage, drive means carried by said carriage for effecting step by step movement of said carriage, drive means selectively moving the same to operative and inoperative positions, said drive means being in timed relation whereby said carriage is moved when said tooth shaping means is in said inoperative position, said saw support including a pair of spaced mounting members secured to said base, each of said mounting members including vertical sleeves, a saw clamp, pins carried by said saw clamp slidably mounted in said vertical sleeve, a cam track carried by said carriage, a follower engaged with said cam track, means connecting said follower to said pins whereby said pins are raised and lowered in response to movement of said carriage along said base to form teeth along a curved path, said connecting means including a rocker arm for each of said pins, each rocker arm having a portion on which one of said pins is seated.

4. A saw tooth shaping device comprising a base, a saw support carried by said base, a carriage mounted on said base for longitudinal movement therealong, a tooth shaping device carried by said carriage, drive means carried by said carriage for effecting step by step movement of said carriage, drive means selectively moving the same to operative and inoperative positions, said drive means being in timed relation whereby said carriage is moved when said tooth shaping means is in said inoperative position, said saw support being mounted for movement towards said tooth shaping device, a cam track carried by said carriage, a follower engaged with said cam track, means connecting said follower to said saw support whereby said saw support is raised and lowered in response to movement of said carriage along said base to form teeth along a curved path, said saw support including a pair of spaced mounting assemblies, and a saw clamp, means for shifting said saw clamp longitudinally of said base to properly position a saw to be shaped.

5. A saw tooth shaping device comprising a base, a saw support carried by said base, a carriage mounted on said base for longitudinal movement therealong, a tooth shaping device carried by said carriage, drive means carried by said carriage for effecting step by step movement of said carriage, drive means selectively moving the same to operative and inoperative positions, said drive means being in timed relation whereby said carriage is moved when said tooth shaping means is in said inoperative position, said saw support including a pair of spaced mounting members secured to said base, each of said mounting members including vertical sleeves, a saw clamp, pins carried by said saw clamp slidably mounted in said vertical sleeve, a cam track carried by said carriage, a follower engaged with said cam track, means connecting said follower to said pins whereby said pins are raised and lowered in response to movement of said carriage along said base to form teeth along a curved path, said saw clamp being supported by said pins for shifting longitudinally of said pins to properly position a saw to be shaped.

6. A saw sharpening machine comprising a base, a saw support carried by said base, a carriage mounted on said base for longitudinal movement therealong, a mounting bracket secured to said carriage for pivotal movement about a vertical pivot axis, an abrasive member, mounting means connecting said abrasive member to said mounting bracket for movement away from said saw support, and drive means for pivoting said mounting bracket to effect the swinging of said sharpening member relative to said saw support whereby the bevel of adjacent teeth of a saw carried by said saw support is reversed, said drive means including means for elevating said abrasive member during said swinging movement, and carriage drive means effecting shifting of said carriage and said abrasive member relative to said saw support while said abrasive member is elevated, said saw support being mounted for movement towards said tooth shaping device, a cam track carried by said carriage, a follower engaged with said cam track, means connecting said follower to said saw support whereby said saw support is raised and lowered in response to movement of said carriage along said base to form teeth along a curved path.

7. A saw sharpening machine comprising a base, a saw support carried by said base, a carriage mounted on said base for longitudinal movement therealong, a mounting bracket secured to said carriage for pivotal movement about a vertical pivot axis, an abrasive member, mounting means connecting said abrasive member to said mounting bracket for movement away from said saw support, and drive means for pivoting said mounting bracket to effect the swinging of said sharpening member relative to said saw support whereby the bevel of adjacent teeth of a saw carried by said saw support is reversed, said drive means including means for elevating said abrasive member during said swinging movement, and carriage drive means effecting shifting of said carriage and said abrasive member relative to said saw support while said abrasive member is elevated, said saw support including a pair of spaced mounting members secured to said base, each of said mounting members including vertical sleeves, a saw clamp, pins carried by said saw clamp slidably mounted in said vertical sleeve, a cam track carried by said carriage, a follower engaged with said cam track, means connecting said follower to said pins whereby said pins are raised and lowered in response to movement of said carriage along said base to form teeth along a curved path.

8. A saw sharpening machine comprising a base, a saw support carried by said base, a carriage mounted on said base for longitudinal movement therealong, a mounting bracket secured to said carriage for pivotal movement about a vertical pivot axis, an abrasive member, mounting means connecting said abrasive member to said mounting bracket for movement away from said saw support, and drive means for pivoting said mounting bracket to effect the swinging of said sharpening member relative to said saw support whereby the bevel of adjacent teeth of a saw carried by said saw support is reversed, said drive means including means for elevating said abrasive member during said swinging movement, and carriage drive means effecting shifting of said carriage and said abrasive member relative to said saw support while said abrasive member is elevated, said saw support including a pair of spaced mounting members secured to said base, each of said mounting members including vertical sleeves, a saw clamp, pins carried by said saw clamp slidably mounted in said vertical sleeve, a cam track carried by said carriage, a follower engaged with said cam track, means connecting said follower to said pins whereby said pins are raised and lowered in response to movement of said carriage along said base to form teeth along a curved path, said connecting means including a rocker arm for each of said pins, each rocker arm having a portion on which one of said pins is seated.

9. A saw sharpening machine comprising a base, a saw support carried by said base, a carriage mounted on said base for longitudinal movement therealong, a mounting bracket secured to said carriage for pivotal movement about a vertical pivot axis, an abrasive member, mounting means connecting said abrasive member to said mounting bracket for movement away from said saw support, and drive means for pivoting said mounting bracket to effect the swinging of said sharpening member relative to said saw support whereby the bevel of adjacent teeth of a saw carried by said saw support is reversed, said drive means including means for elevating said abrasive member during said swinging movement, and carriage drive means effecting shifting of said carriage and said abrasive member relative to said saw support while said abrasive member is elevated, said saw support being mounted for movement towards said tooth shaping device, a cam track carried by said carriage, a follower engaged with said cam track, means connecting said follower to said saw support whereby said saw support is raised and lowered in response to movement of said carriage along said base to form teeth along a curved path, said saw support including a pair of spaced mounting assemblies, and a saw clamp, means for shifting said saw clamp longitudinally of said base to properly position a saw to be shaped.

10. A saw sharpening machine comprising a base, a saw support carried by said base, a carriage mounted on said base for longitudinal movement therealong, a mounting bracket secured to said carriage for pivotal movement about a vertical pivot axis, an abrasive member, mounting means connecting said abrasive member to said mounting bracket for movement away from said saw support, and drive means for pivoting said mounting bracket to effect the swinging of said sharpening member relative to said saw support whereby the bevel of adjacent teeth of a saw carried by said saw support is reversed, said drive means including means for elevating said abrasive member during said swinging movement, and carriage drive means effecting shifting of said carriage and said abrasive member relative to said saw support while said abrasive member is elevated, said saw support including a pair of spaced mounting members secured to said base, each of said mounting members including vertical sleeves, a saw clamp, pins carried by said clamp slidably mounted in said vertical sleeve, a cam track carried by said carriage, a follower engaged with said cam track, means connecting said follower to said pins whereby said pins are raised and lowered in response to movement of said carriage along said base to form teeth along a curved path, said saw clamp being supported by said pins for shifting longitudinally of said pins to properly position a saw to be shaped.

11. A saw sharpening machine comprising a base, a saw support carried by said base, a carriage mounted on said base for longitudinal movement therealong, a mounting bracket secured to said carriage for pivotal movement about a vertical pivot axis, an abrasive member, mounting means connecting said abrasive member to said mounting bracket for movement away from said saw support, and drive means for pivoting said mounting bracket to effect the swinging of said sharpening member relative to said saw support whereby the bevel of adjacent teeth of a saw carried by said saw support is reversed, said drive means including means for elevating said abrasive member during said swinging movement, and carriage drive means effecting shifting of said carriage and said abrasive member relative to said saw support while said abrasive member is elevated, said saw support including a saw clamp mounted for transverse rocking movement.

12. A saw sharpening machine comprising a base, a saw support carried by said base, a carriage mounted on said base for longitudinal movement therealong, a mounting bracket secured to said carriage for pivotal movement about a vertical pivot axis, an abrasive member, mounting means connecting said abrasive member to said mounting bracket for movement away from said saw support, and drive means for pivoting said mounting bracket to effect the swinging of said sharpening member relative to said saw support whereby the bevel of adjacent teeth of a saw carried by said saw support is reversed, said drive means including means for elevating said abrasive member during said swinging movement, and carriage drive means effecting shifting of said carriage and said abrasive member relative to said saw support while said abrasive member is elevated, said saw support including a saw clamp mounted for transverse rocking movement, said drive means including means for rocking said saw clamp.

13. A saw sharpening machine comprising a base, a saw supported carried by said base, a carriage mounted on said base for longitudinal movement therealong, a mounting bracket secured to said carriage for pivotal movement about a vertical pivot axis, an abrasive member, mounting means connecting said abrasive member to said mounting bracket for movement away from said saw support, and drive means for pivoting said mounting bracket to effect the swinging of said sharpening member relative to said saw support whereby the bevel of adjacent teeth of a saw carried by said saw support is reversed, said drive means including means for elevating said abrasive member during said swinging movement, and carriage drive means effecting shifting of said carriage and said abrasive member relative to said saw support while said abrasive member is elevated, said saw support including a pair of spaced mounting members secured to said base, each of said mounting members including vertical sleeves, a saw clamp, pins carried by said saw clamp slidably mounted in said vertical sleeve, a cam track carried by said carriage, a follower engaged with said cam track, means connecting said follower to said pins whereby said pins are raised and lowered in response to movement of said carriage along said base to form teeth along a curved path, means mounting said saw clamp on said pins for relative transverse rocking movement simultaneously with the pivoting of said abrasive member.

14. A saw tooth shaping device comprising a base, a saw support carried by said base, a carriage mounted on said base for longitudinal movement therealong, a tooth shaping device carried by said carriage, drive means carried by said carriage for effecting step by step movement of said carriage, drive means selectively moving the same to operative and inoperative positions, said drive means being in timed relation whereby said carriage is moved when said tooth shaping means is in said inoperative position, said carriage drive means including a rack wheel and dog assembly, said rack wheel being replaceable whereby said movement of said carriage is equal to the tooth spacing of a saw to be worked upon, cooperating stop means on said carriage and said base for initially positioning said carriage to align said tooth shaping device with said saw support.

(References on following page)

References Cited in the file of this patent

UNITED STATES PATENTS

| | | |
|---|---|---|
| 163,326 | McSweeny | May 18, 1875 |
| 630,288 | Cornish | Aug. 1, 1899 |
| 953,895 | Chambers | Apr. 5, 1910 |
| 1,079,145 | Richard | Nov. 18, 1913 |
| 1,157,890 | Miotke | Oct. 26, 1915 |
| 1,832,878 | Porter | Nov. 24, 1931 |
| 1,846,331 | Hickey | Feb. 23, 1932 |
| 1,909,832 | Jirka | May 16, 1933 |
| 2,300,717 | Wilbert | Nov. 3, 1942 |
| 2,329,879 | Christy et al. | Sept. 21, 1943 |
| 2,519,735 | Boutin | Aug. 22, 1950 |
| 2,619,851 | Moohl | Dec. 2, 1952 |